US012804603B2

(12) United States Patent
Hong

(10) Patent No.: US 12,804,603 B2
(45) Date of Patent: Nov. 17, 2026

(54) CAPABILITY EXCHANGE METHOD AND APPARATUS, AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 283 days.

(21) Appl. No.: 18/693,581

(22) PCT Filed: Sep. 24, 2021

(86) PCT No.: PCT/CN2021/120445
§ 371 (c)(1),
(2) Date: Mar. 20, 2024

(87) PCT Pub. No.: WO2023/044799
PCT Pub. Date: Mar. 30, 2023

(65) Prior Publication Data
US 2024/0389070 A1 Nov. 21, 2024

(51) Int. Cl.
*H04W 68/02* (2009.01)
*H04L 5/00* (2006.01)
*H04W 8/22* (2009.01)
*H04W 24/02* (2009.01)
*H04W 92/20* (2009.01)

(52) U.S. Cl.
CPC ........... *H04W 68/02* (2013.01); *H04L 5/0053* (2013.01); *H04W 8/22* (2013.01); *H04W 24/02* (2013.01); *H04W 92/20* (2013.01)

(58) Field of Classification Search
CPC ....... H04W 68/02; H04W 8/22; H04W 24/02; H04W 92/20; H04L 5/0053
USPC .......................................................... 370/329
See application file for complete search history.

(56) References Cited

U.S. PATENT DOCUMENTS

2022/0303860 A1* 9/2022 Xu ...................... H04W 68/005
2022/0361132 A1* 11/2022 Gurumoorthy ..... H04W 60/005
2023/0038897 A1* 2/2023 Li ......................... H04W 68/02
(Continued)

FOREIGN PATENT DOCUMENTS

CN 105578560 A 5/2016
CN 105848228 A 8/2016
(Continued)

OTHER PUBLICATIONS

ISA State Intellectual Property Office of the People's Republic of China, International Search Report issued in Application No. PCT/CN2021/120445, May 30, 2022, WIPO, 4 pages.
(Continued)

*Primary Examiner* — Ayman A Abaza
(74) *Attorney, Agent, or Firm* — Finnegan, Henderson, Farabow, Garrett & Dunner, L.L.P.

(57) ABSTRACT

A capability exchange method is performed by a first base station, and includes: sending first paging cause capability information to a second base station, wherein the first paging cause capability information indicates paging cause capabilities supported by the first base station; and receiving second paging cause capability information sent by the second base station, wherein the second paging cause capability information indicates paging cause capabilities supported by the second base station.

10 Claims, 11 Drawing Sheets

(56) References Cited

U.S. PATENT DOCUMENTS

| | | | | |
|---|---|---|---|---|
| 2024/0179678 | A1 | 5/2024 | Hong | |
| 2024/0323914 | A1 * | 9/2024 | Wu | H04W 68/005 |

FOREIGN PATENT DOCUMENTS

| | | | | |
|---|---|---|---|---|
| CN | 109392092 A | 2/2019 | | |
| CN | 110945920 A | 3/2020 | | |
| CN | 113228763 A | 8/2021 | | |
| CN | 113228764 A | 8/2021 | | |
| WO | WO 2015/083063 A2 | 6/2015 | | |
| WO | WO-2016054893 A1 * | 4/2016 | | H04W 48/10 |
| WO | 2020185949 A2 | 9/2020 | | |

OTHER PUBLICATIONS

Futurewei "Discussion on paging service indication for Musim", 3GPP TSG-RAN WG2 Meeting #115 electronic, R2-2108549, Online, Aug. 16-Aug. 27, 2021, Revision of R2-2105451, 4 pages.

Extended European Search Report Issued in Application No. 21957924.0 dated Nov. 4, 2024, 10 pages.

ISA State Intellectual Property Office of the People's Republic of China, Written Opinion of the International Searching Authority Issued in Application No. PCT/CN2021/120445, May 30, 2022, WIPO, 6 pages.

The First Office Action issued by the State Intellectual Property Office of People's Republic of China on Jul. 22, 2025, in corresponding Application No. CN 202180002999.1, 9 pages.

"Introduction of a Paging cause indication", Ericsson, 3GPP TSG-RAN WG2 #113-e, Revision of R2-2010535, Electronic meeting, Jan. 25-Feb. 5, 2021, 6 pages.

"Summary of AI 8.3.4: Paging with service indication", vivo, 3GPP TSG-RAN WG2 #113bis-e, R2-2104320, e-Meeting, Apr. 12-20, 2021, 7 pages.

"Consideration on the Service Indication", ZTE Corporation, Sanechips, 3GPP TSG-RAN WG2 Meeting #114-e, R2-2105166, Online, May 19-27, 2021, 6 pages.

* cited by examiner

CAPABILITY EXCHANGE METHOD AND APPARATUS, AND STORAGE MEDIUM

CROSS-REFERENCE TO RELATED APPLICATION

The present application is a U.S. National Stage of International Application No. PCT/CN2021/120445, filed on Sep. 24, 2021, the contents of which are incorporated herein by reference in their entirety.

TECHNICAL FIELD

The present disclosure relates to the field of communications and, in particular, to capability exchange methods and apparatuses, and storage media.

BACKGROUND

With the development of wireless communication technology, there are more and more multiple subscriber identity module (multi-SIM) terminals in the market. At present, processing methods of multi-SIM terminals are mainly based on the implementation of various terminal manufacturers, which leads to many different terminal behaviors and processing methods, e.g., Dual-SIM Single-standby, Dual-SIM Dual-Standby Single-Active, Dual-SIM Dual-standby Dual-Active, etc., and may cause some problems. For example, when a multi-SIM terminal is communicating with a first system, it needs to switch a connection to a second system from time to time for operation, such as monitoring paging, performing measurement, and reading system messages, and this may have an impact on the performance of the first system. If these operations are not carried out in the second system, such as not monitoring paging, it may cause that a service of the second system cannot be established. For some operations, such as a long-time operation, the multi-SIM terminal needs to release a radio resource control (RRC) connection with the first system, and for some operations, such as a short-time operation, the multi-SIM terminal does not need to release the RRC connection with the first system.

The multi-SIM terminal needs to know a paging cause of the second system in order to better decide whether to leave the first system and whether to release the RRC connection with the first system. This requires a base station to inform the multi-SIM terminal of the paging cause, but at present, interaction between base stations does not support paging cause capabilities.

SUMMARY

In order to overcome the problems existing in the related art, embodiments of the present disclosure provide capability exchange methods and apparatuses, and storage media.

According to a first aspect of an embodiment of the present disclosure, a capability exchange method is provided, which is performed by a first base station and includes:

- sending first paging cause capability information to a second base station, where the first paging cause capability information is used to indicate paging cause capabilities supported by the first base station; and
- receiving second paging cause capability information sent by the second base station, where the second paging cause capability information is used to indicate paging cause capabilities supported by the second base station.

According to a second aspect of an embodiment of the present disclosure, a capability exchange method is provided, which is performed by a first base station and includes:

- sending third paging cause capability information to a second base station, where the third paging cause capability information is used to indicate paging cause capabilities supported by the first base station and/or paging cause capabilities supported by at least one neighbouring base station of the first base station; and
- receiving fourth paging cause capability information sent by the second base station, where the fourth paging cause capability information is used to indicate paging cause capabilities supported by the second base station and/or paging cause capabilities supported by at least one neighbouring base station of the second base station.

According to a third aspect of an embodiment of the present disclosure, a capability exchange apparatus is provided, including:

- a processor; and
- a memory, configured to store processor-executable instructions;
- where the processor is configured to:
- send first paging cause capability information to a second base station, wherein the first paging cause capability information is used to indicate paging cause capabilities supported by a first base station; and
- receive second paging cause capability information sent by the second base station, wherein the second paging cause capability information is used to indicate paging cause capabilities supported by the second base station.

BRIEF DESCRIPTION OF DRAWINGS

The accompanying drawings, which are incorporated in and constitute a part of the specification, illustrate embodiments consistent with the present disclosure, and are used together with the specification to explain the principles of the present disclosure.

DETAILED DESCRIPTION

Reference will now be made in detail to embodiments of the present disclosure, examples of which are illustrated in the accompanying drawings. When the following description refers to the accompanying drawings, unless otherwise indicated, the same numbers in different accompanying drawings indicate the same or similar elements. Implementations described in the following embodiments of the present disclosure do not represent all implementations consistent with the present disclosure. Rather, they are merely examples of apparatuses and methods consistent with some aspects of the present disclosure as detailed in the appended claims.

Terms used in the present disclosure are only for a purpose of describing specific embodiments, and are not limiting the present disclosure. Singular forms of "a," "said," and "the" used in the present disclosure and in the claims are also intended to include majority forms, unless the context clearly indicates otherwise. It should also be understood that the term "and/or" as used herein refers to any or all of the possible combinations containing at least one of the listed items in association.

It should be understood that although terms first, second, third, etc. may be used to describe various information in the present disclosure, these information should not be limited to these terms. These terms are used only to distinguish the same type of information from one another. For example, without departing from the scope of the present disclosure, first information can also be called second information, and similarly, the second information can also be called the first information. Depending on the context, the word "if" as used herein can be interpreted as "at" or "when" or "in response to determining".

The capability exchange solution provided by the present disclosure can be applied to different scenarios, including but not limited to dual connectivity system scenarios and non-dual connectivity system scenarios.

The following first describes a capability exchange solution provided by the present disclosure for a dual connectivity system scenario.

Figure 1:
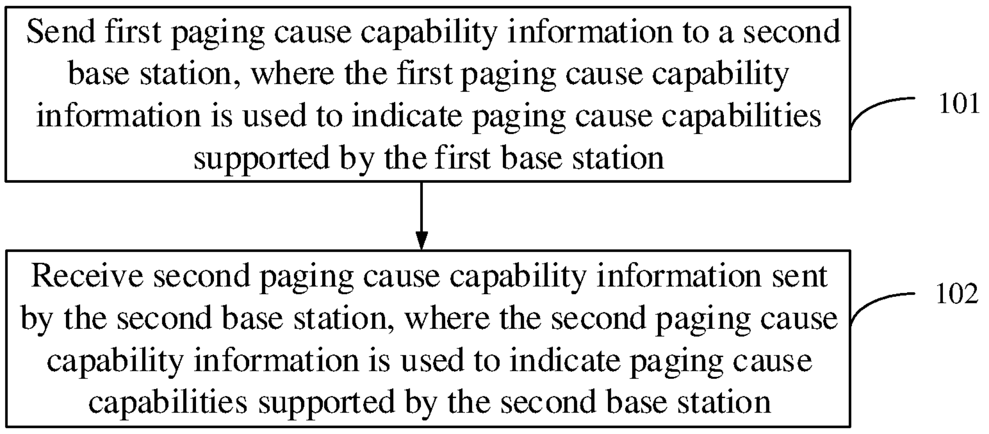
FIG. 1 is a schematic flowchart of a capability exchange method illustrated according to an embodiment of the present disclosure.

An embodiment of the present disclosure provides a capability exchange method, referring to FIG. 1, FIG. 1 is a flowchart of a capability exchange method illustrated according to an embodiment, which can be performed by a first base station, and the method may include the following steps.

At step 101, first paging cause capability information is sent to a second base station, where the first paging cause capability information is used to indicate paging cause capabilities supported by the first base station.

At step 102, second paging cause capability information sent by the second base station is received, where the second paging cause capability information is used to indicate paging cause capabilities supported by the second base station.

It should be noted that the present disclosure does not limit an execution order of step 101 and step 102, for example, step 101 can be executed before step 102, or step 102 can be executed before step 101.

In the above embodiment, paging cause capabilities supported by each base station can be exchanged between base stations, thus improving the usability of the paging cause mechanism.

Figure 2:
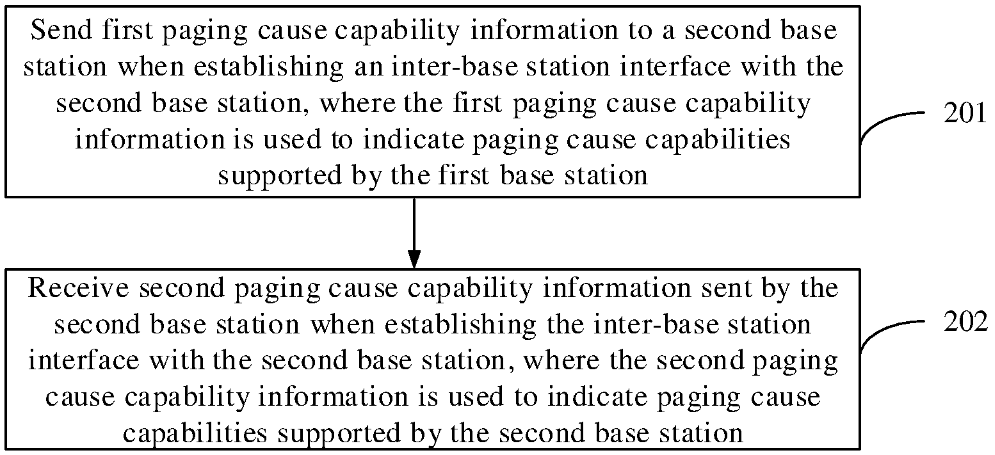
FIG. 2 is a schematic flowchart of another capability exchange method according to an embodiment of the present disclosure.

In some embodiments, with reference to FIG. 2, FIG. 2 is a flowchart of a capability exchange method illustrated according to an embodiment, which can be performed by a first base station, and the method may include the following steps.

At step 201, first paging cause capability information is sent to a second base station when establishing an inter-base station interface with the second base station, where the first paging cause capability information is used to indicate paging cause capabilities supported by the first base station.

At step 202, second paging cause capability information sent by the second base station is received when establishing the inter-base station interface with the second base station, where the second paging cause capability information is used to indicate paging cause capabilities supported by the second base station.

Similarly, the present disclosure does not limit an execution order of step 201 and step 202, for example, step 201 can be executed before step 202, or step 202 can be executed before step 201.

In the above embodiment, in a process of establishing an interface between two base stations, paging cause capabilities supported by each base station can be exchanged, and the paging cause capabilities supported by each base station do not need to be exchanged through separate signaling, so that the implementation is simple and convenient, and the usability of the paging cause mechanism is improved.

Furthermore, it should be understood that an interaction of capabilities may not be limited to a period of establishing the interface between base stations, but may be within a predetermined time after establishing the interface, etc., which is not limited by the present disclosure.

In some embodiments, the first paging cause capability information for indicating the paging cause capabilities supported by the first base station may include, but is not limited to, at least one of the following: whether the first base station supports the paging cause capabilities; and/or capability information of at least one paging cause capability supported by the first base station.

The second paging cause capability information for indicating the paging cause capabilities supported by the second base station may include, but is not limited to, at least one of the following: whether the second base station supports the paging cause capabilities; and/or capability information of at least one paging cause capability supported by the second base station.

The capability information of at least one paging cause capability supported by each base station can correspond to at least one paging cause. In the embodiment of the present disclosure, the paging causes include but are not limited to a need for a terminal to monitor paging messages, a need for the terminal to measure, and a need for the terminal to read system messages.

In a possible implementation, the first base station and the second base station can exchange whether they support paging cause capabilities through the first paging cause capability information and the second paging cause capability information.

In a possible implementation, the first base station and the second base station can exchange the capability information of at least one paging cause capability supported by each other through the first paging cause capability information and the second paging cause capability information.

In a possible implementation, the first base station may send to the second base station the first paging cause capability information of whether it supports the paging cause capabilities, and receive the second paging cause capability information sent by the second base station, including the capability information of at least one paging cause capability supported by the second base station.

In another possible implementation, the first base station may send to the second base station the first paging cause capability information of at least one paging cause capability supported by itself, and receive from the second base station the second paging cause capability information of whether the second base station supports the paging cause capabilities.

The above is only an explanation, and the ways in which base stations interact with each other's supported paging cause capabilities shall all fall within the scope of protection of the present disclosure.

In the above embodiment, the base stations can exchange whether they support paging cause capabilities and the capability information of at least one supported paging cause capability through different paging cause capability information, so that the usability is high.

Figure 3:
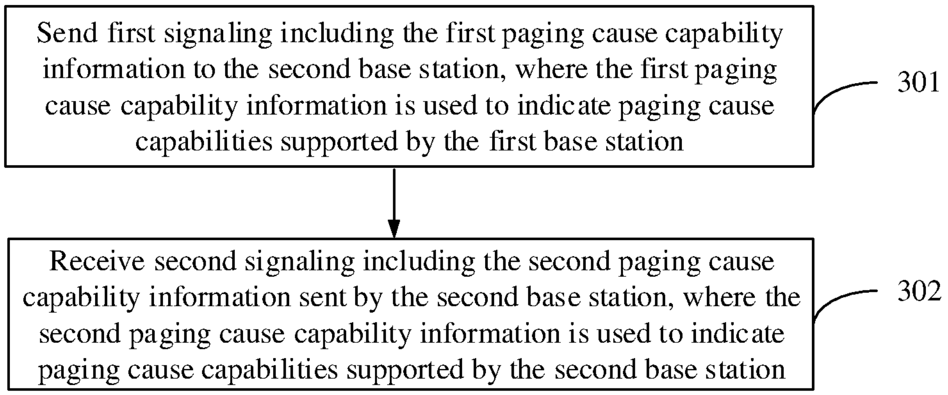
FIG. 3 is a schematic flowchart of another capability exchange method according to an embodiment of the present disclosure.

In some embodiments, for a dual connectivity system, in the case that the first base station is a master base of the dual connectivity system and the second base station is a secondary base station of the dual connectivity system, with reference to FIG. 3, FIG. 3 is a flowchart of a capability exchange method illustrated according to an embodiment, which can be performed by the first base station as the master base station, and the method may include the following steps.

At step 301, first signaling including the first paging cause capability information is sent to the second base station, where the first paging cause capability information is used to indicate paging cause capabilities supported by the first base station.

At step 302, second signaling including the second paging cause capability information sent by the second base station is received, where the second paging cause capability information is used to indicate paging cause capabilities supported by the second base station.

In the embodiment of the present disclosure, step 301 may be performed first, followed by step 302.

In the above embodiment, the paging cause capabilities supported by each base station can be exchanged through different signaling, thus improving the usability of the paging cause mechanism.

Figure 4:
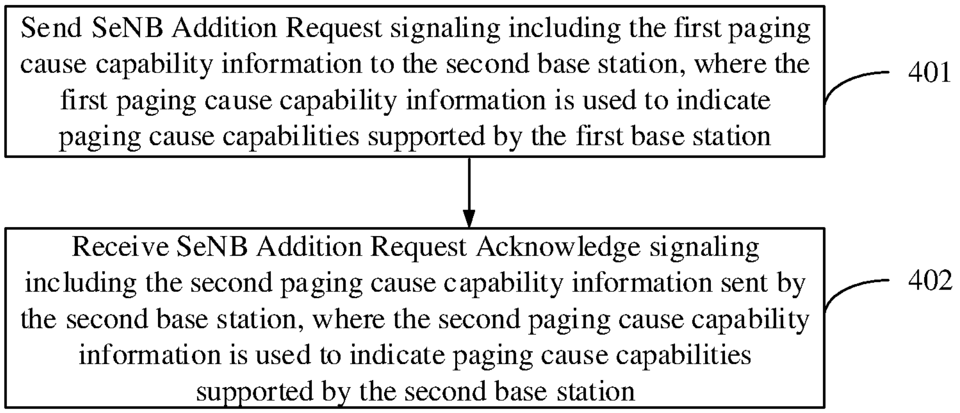
FIG. 4 is a schematic flowchart of another capability exchange method according to an embodiment of the present disclosure.

In some embodiments, for a dual connectivity system, in the case that the first base station is a master base of the dual connectivity system and the second base station is a secondary base station of the dual connectivity system, and both the first base station and the second base station are evolved UMTS terrestrial radio access network (E-UTRAN) base stations, with reference to FIG. 4, FIG. 4 is a flowchart of a capability exchange method illustrated according to an embodiment, which can be performed by the first base station as the master base station, and the method may include the following steps.

At step 401, SeNB Addition Request (secondary nodeB addition request) signaling including the first paging cause capability information is sent to the second base station, where the first paging cause capability information is used to indicate paging cause capabilities supported by the first base station.

At step 402, SeNB Addition Request Acknowledge (secondary nodeB addition request acknowledge) signaling including the second paging cause capability information sent by the second base station is received, where the second paging cause capability information is used to indicate paging cause capabilities supported by the second base station.

In the embodiment of the present disclosure, step 401 may be performed first, followed by step 402.

In the above embodiment, for the dual connectivity scenario where both the master base station and the secondary base station are E-UTRAN base stations, the first base station and the second base station can exchange their supported paging cause capabilities through the SeNB Addition Request signaling and the SeNB Addition Request Acknowledge signaling, which is simple and convenient to implement and has high usability.

Figure 5:
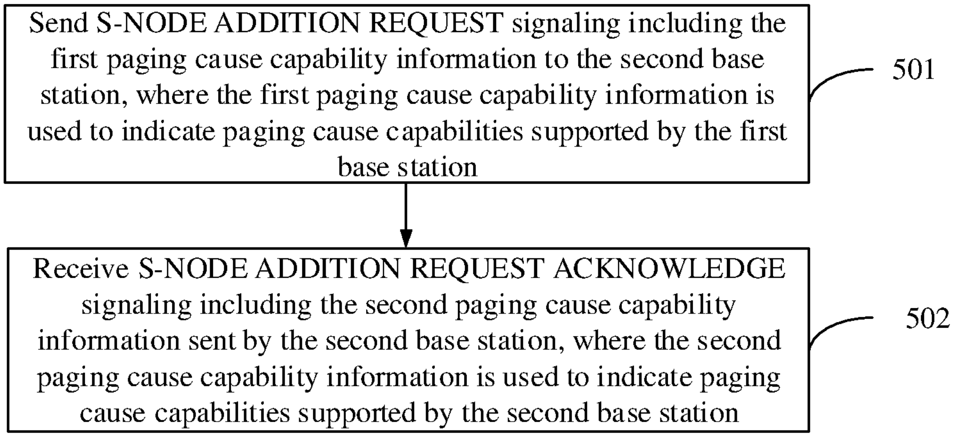
FIG. 5 is a schematic flowchart of another capability exchange method according to an embodiment of the present disclosure.

In some embodiments, for a dual connectivity system, in the case that the first base station is a master base of the dual connectivity system and the second base station is a secondary base station of the dual connectivity system, and both the first base station and the second base station are new radio (NR) base stations, with reference to FIG. 5, FIG. 5 is a flowchart of a capability exchange method illustrated according to an embodiment, which can be performed by the first base station as the master base station, and the method may include the following steps.

At step 501, S-NODE ADDITION REQUEST (secondary node addition request) signaling including the first paging cause capability information is sent to the second base station, where the first paging cause capability information is used to indicate paging cause capabilities supported by the first base station.

At step 502, S-NODE ADDITION REQUEST ACKNOWLEDGE (secondary node addition request acknowledge) signaling including the second paging cause capability information sent by the second base station is received, where the second paging cause capability information is used to indicate paging cause capabilities supported by the second base station.

In the embodiment of the present disclosure, step 501 may be performed first, followed by step 502.

In the above embodiment, for the dual connectivity scenario where both the master base station and the secondary base station are NR base stations, the first base station and the second base station can exchange their supported paging cause capabilities through the S-NODE ADDITION REQUEST signaling and the S-NODE ADDITION REQUEST ACKNOWLEDGE signaling, which is simple and convenient to implement and has high usability.

Figure 6:
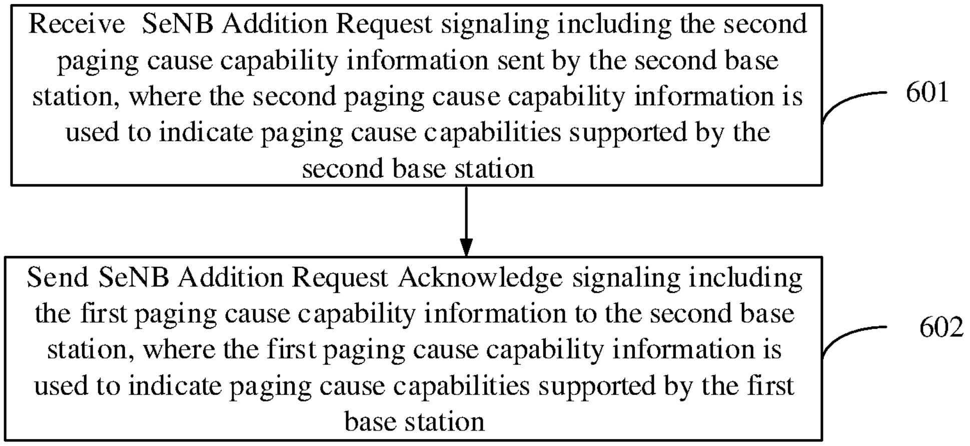
FIG. 6 is a schematic flowchart of another capability exchange method according to an embodiment of the present disclosure.

In some embodiments, for a dual connectivity system, in the case that the first base station is a secondary base of the dual connectivity system and the second base station is a master base station of the dual connectivity system, and both the first base station and the second base station are E-UTRAN base stations, with reference to FIG. 6, FIG. 6 is a flowchart of a capability exchange method illustrated according to an embodiment, which can be performed by the first base station as the secondary base station, and the method may include the following steps.

At step 601, SeNB Addition Request signaling including the second paging cause capability information sent by the second base station is received, where the second paging cause capability information is used to indicate paging cause capabilities supported by the second base station.

At step 602, SeNB Addition Request Acknowledge signaling including the first paging cause capability information is sent to the second base station, where the first paging cause capability information is used to indicate paging cause capabilities supported by the first base station.

In the embodiment of the present disclosure, step 601 may be performed first, followed by step 602.

In the above embodiment, for the dual connectivity scenario where both the master base station and the secondary base station are E-UTRAN base stations, the second base station and the first base station can exchange their supported paging cause capabilities through the SeNB Addition Request signaling and the SeNB Addition Request Acknowledge signaling, which is simple and convenient to implement and has high usability.

Figure 7:
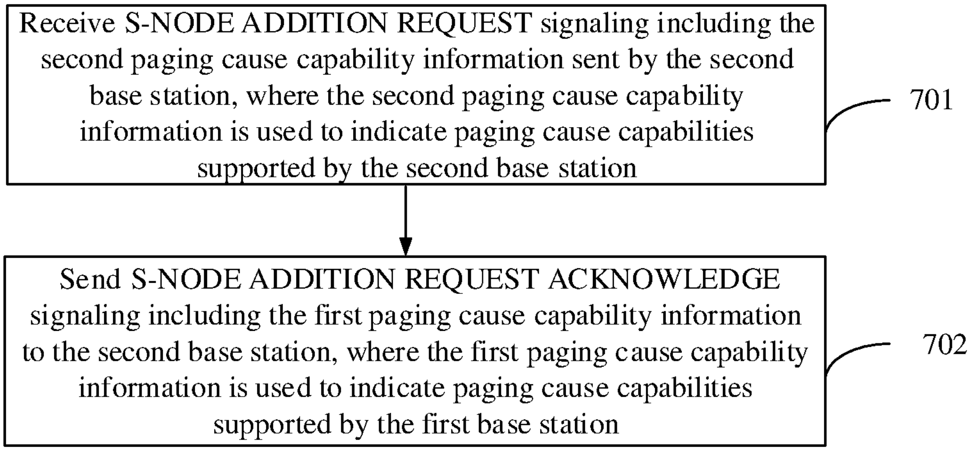
FIG. 7 is a schematic flowchart of another capability exchange method according to an embodiment of the present disclosure.

In some embodiments, for a dual connectivity system, in the case that the first base station is a secondary base of the dual connectivity system and the second base station is a master base station of the dual connectivity system, and both the first base station and the second base station are NR base stations, with reference to FIG. 7, FIG. 7 is a flowchart of a capability exchange method illustrated according to an embodiment, which can be performed by the first base station as the secondary base station, and the method may include the following steps.

At step 701, S-NODE ADDITION REQUEST signaling including the second paging cause capability information sent by the second base station is received, where the second paging cause capability information is used to indicate paging cause capabilities supported by the second base station.

At step 702, S-NODE ADDITION REQUEST ACKNOWLEDGE signaling including the first paging cause capability information is sent to the second base station, where the first paging cause capability information is used to indicate paging cause capabilities supported by the first base station.

In the embodiment of the present disclosure, step 701 may be performed first, followed by step 702.

In the above embodiment, for the dual connectivity scenario where both the master base station and the secondary base station are NR base stations, the second base station and the first base station can exchange their supported paging cause capabilities through the S-NODE ADDITION REQUEST signaling and the S-NODE ADDITION REQUEST ACKNOWLEDGE signaling, which is simple and convenient to implement and has high usability.

Figure 8:
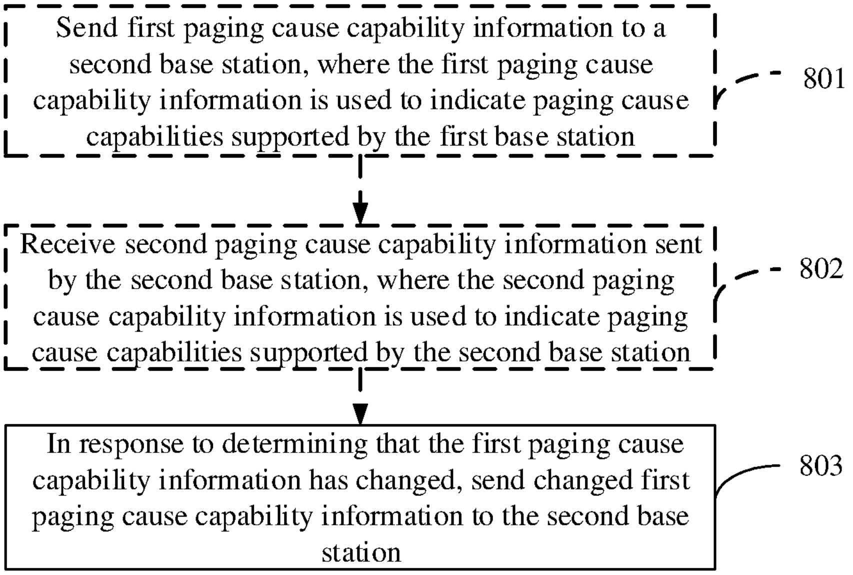
FIG. 8 is a schematic flowchart of a capability exchange method illustrated according to an embodiment of the present disclosure.

In some embodiments, with reference to FIG. 8, FIG. 8 is a flowchart of a capability exchange method illustrated according to an embodiment, which can be performed by a first base station, and the method may include the following steps.

At step 803, in response to determining that the first paging cause capability information has changed, changed first paging cause capability information is sent to the second base station.

In the above embodiment, this step can be implemented independently, in which the first base station can send the changed first paging cause capability information to the second base station in time when the first base station determines that a paging cause capability it supports has changed, e.g., the first paging cause capability information has changed, thus improving the usability of the paging cause mechanism.

In some examples, in the above embodiment, before executing step 803, the method may include the following.

At step 801, first paging cause capability information is sent to a second base station, where the first paging cause capability information is used to indicate paging cause capabilities supported by the first base station.

At step 802, second paging cause capability information sent by the second base station is received, where the second paging cause capability information is used to indicate paging cause capabilities supported by the second base station.

It should be noted that the present disclosure does not limit an execution order of step 801 and step 802.

In the above embodiment, the base stations can exchange their supported paging cause capabilities first, and then the first base station sends the changed first paging cause capability information to the second base station when determining that its own paging cause capability has changed, thus improving the usability of the paging cause mechanism.

Figure 9:
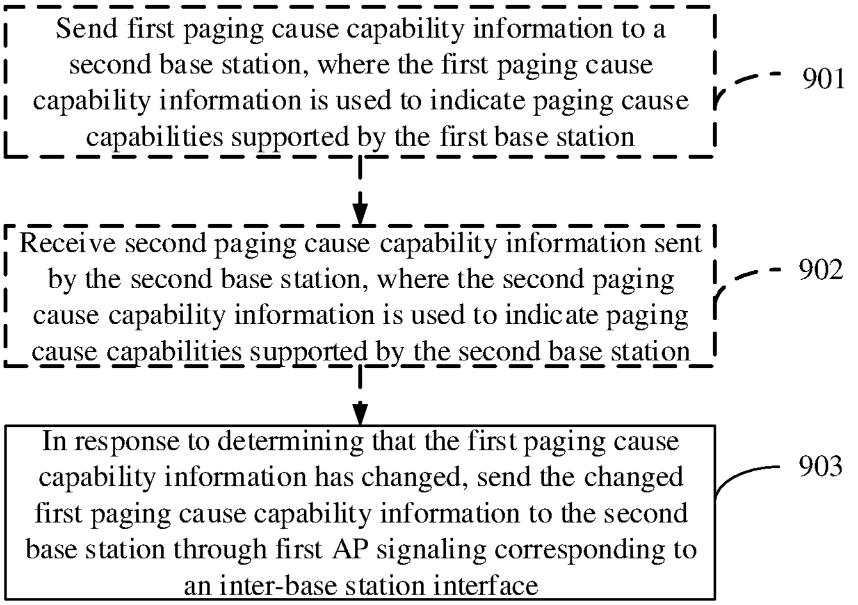
FIG. 9 is a schematic flowchart of another capability exchange method according to an embodiment of the present disclosure.

In some embodiments, with reference to FIG. 9, FIG. 9 is a flowchart of a capability exchange method illustrated according to an embodiment, which can be performed by a first base station, and the method may include the following steps.

At step 903, in response to determining that the first paging cause capability information has changed, the changed first paging cause capability information is sent to the second base station through first application protocol (AP) signaling corresponding to an inter-base station interface.

In a possible implementation, when the first base station and the second base station are E-UTRAN base stations, the first AP signaling is X2AP signaling.

In another possible implementation, when the first base station and the second base station are NR base stations, the first AP signaling is XnAP signaling.

In the above embodiment, step 903 can be implemented independently, and the first base station sends the changed first paging cause capability information to the second base station through the first AP signaling, which has high availability.

In some examples, before executing step 903, the above method may further include the following.

At step 901, first paging cause capability information is sent to a second base station, where the first paging cause capability information is used to indicate paging cause capabilities supported by the first base station.

At step 902, second paging cause capability information sent by the second base station is received, where the second paging cause capability information is used to indicate paging cause capabilities supported by the second base station.

It should be noted that the present disclosure does not limit an execution order of step 901 and step 902.

Step 903 can be implemented in combination with step 901 and step 902, and the present disclosure does not limit this.

Figure 10:
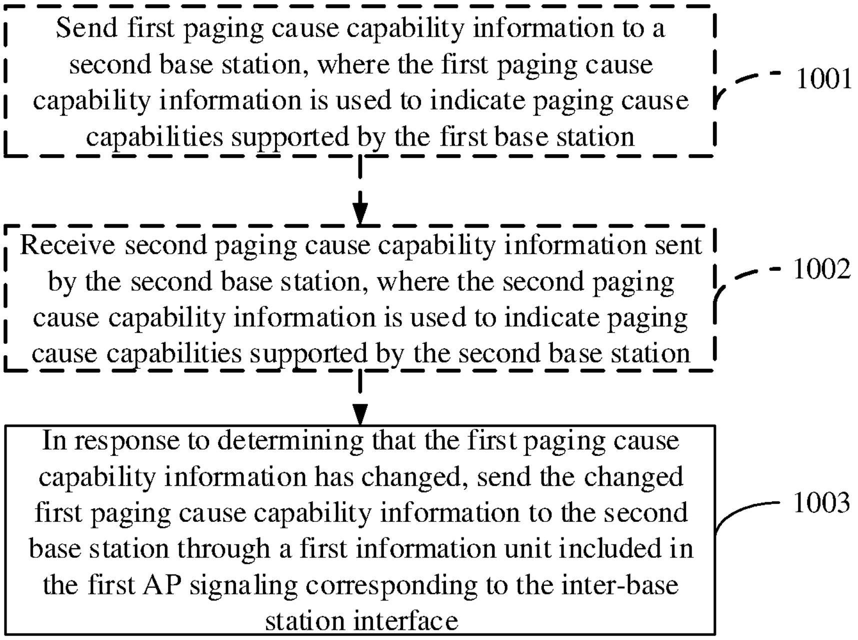
FIG. 10 is a schematic flowchart of another capability exchange method according to an embodiment of the present disclosure.

In some embodiments, with reference to FIG. 10, FIG. 10 is a flowchart of a capability exchange method illustrated according to an embodiment, which can be performed by a first base station, and the method may include the following steps.

At step 1003, in response to determining that the first paging cause capability information has changed, the changed first paging cause capability information is sent to the second base station through a first information element included in the first AP signaling corresponding to the inter-base station interface.

In a possible implementation, when the first base station and the second base station are E-UTRAN base stations, the first AP signaling is X2AP signaling. Specifically, the first AP signaling is ENB CONFIGURATION UPDATE (eNodeB configuration update) signaling, and the first information element includes but is not limited to at least one of the following: a Served Cells To Add (add served cells) information element; and/or a Served Cells To Modify (modify served cells) information element.

In another possible implementation, when the first base station and the second base station are NR base stations, the first AP signaling is XnAP signaling. Specifically, the first AP signaling is NG-RAN NODE CONFIGURATION UPDATE (next generation radio access network node configuration update) signaling. The first information element includes at least one of the following: a next generation (ng) information element; and/or a ng-eNB (next generation eNodeB) information element.

In the above embodiment, step 1003 can be implemented independently, and the first base station sends the changed first paging cause capability information to the second base station through the first information element included in the first AP signaling, which has high availability.

In some examples, before executing step 1003, the method may further include the following.

At step 1001, first paging cause capability information is sent to a second base station, where the first paging cause capability information is used to indicate paging cause capabilities supported by the first base station.

At step 1002, second paging cause capability information sent by the second base station is received, where the second paging cause capability information is used to indicate paging cause capabilities supported by the second base station.

It should be noted that the present disclosure does not limit an execution order of step 1001 and step 1002. Step 1003 can be implemented in combination with step 1001 and step 1002, and the present disclosure does not limit this.

Figure 11:
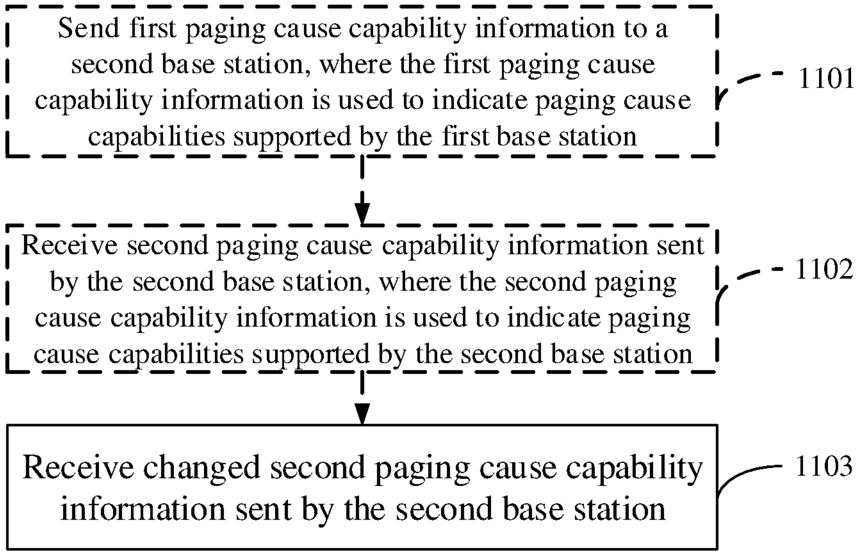
FIG. 11 is a schematic flowchart of another capability exchange method according to an embodiment of the present disclosure.

In some embodiments, with reference to FIG. 11, FIG. 11 is a flowchart of a capability exchange method illustrated according to an embodiment, which can be performed by a first base station, and the method may include the following steps.

At step 1103, changed second paging cause capability information sent by the second base station is received.

In the embodiment of the present disclosure, the way in which the second base station sends the changed second paging cause capability is similar to the way in which the first base station sends the changed first paging cause capability, and the details are not repeated here. The first base station may receive the changed second paging cause capability information through an inter-base station interface.

In the above embodiment, step 1103 can be implemented independently, and the second base station may, in the case of determining a change in its own paging cause capability, promptly send the changed second paging cause capability information to the first base station, thus improving the usability of the paging cause mechanism.

In some examples, before executing the step 1103, the method may further include the following.

At step 1101, first paging cause capability information is sent to a second base station, where the first paging cause capability information is used to indicate paging cause capabilities supported by the first base station.

At step 1102, second paging cause capability information sent by the second base station is received, where the second paging cause capability information is used to indicate paging cause capabilities supported by the second base station.

It should be noted that the present disclosure does not limit an execution order of step 1101 and step 1102. Step 1103 can be implemented in combination with step 1101 and step 1102, and the present disclosure does not limit this.

In some embodiments, if both the first paging cause capability information and the second paging cause capability information are changed, the first base station sends the changed first paging cause capability information to the second base station and receives the changed second paging cause capability information sent by the second base station.

Or, after the first base station and the second base station have exchanged their supported paging cause capabilities, if both the first paging cause capability information and the second paging cause capability information are changed, the first base station sends the changed first paging cause capability information to the second base station and receives the changed second paging cause capability information sent by the second base station.

In the above embodiment, the base stations can interact with each other's changed paging cause capability in time, which is easy to realize and has high availability.

Figure 12:
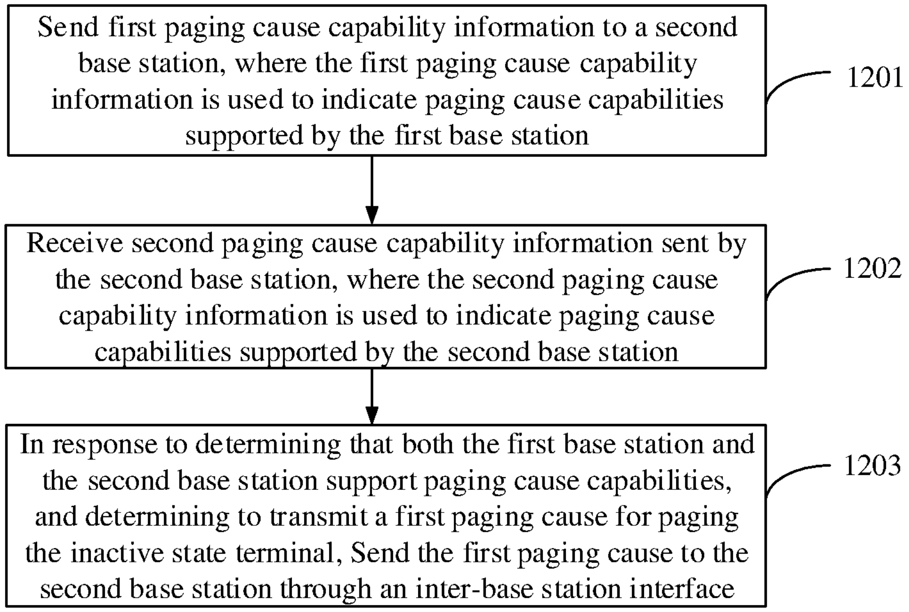
FIG. 12 is a schematic flowchart of another capability exchange method according to an embodiment of the present disclosure.

In some embodiments, the first base station may be an anchor base station corresponding to an inactive terminal, e.g., a terminal in an inactive state, and may refer to as an inactive state terminal, where the anchor base station refers to a last base station that provides services for the terminal before the terminal switches to the inactive state, and the anchor base station retains context information of the terminal. The second base station is a base station corresponding to a cell where the inactive terminal is currently located. Referring to FIG. 12, FIG. 12 is a flowchart of a capability exchange method illustrated according to an embodiment, which can be performed by a first base station, and the method may include the following steps.

At step 1201, first paging cause capability information is sent to a second base station, where the first paging cause capability information is used to indicate paging cause capabilities supported by the first base station.

At step 1202, second paging cause capability information sent by the second base station is received, where the second paging cause capability information is used to indicate paging cause capabilities supported by the second base station.

It should be noted that the present disclosure does not limit an execution order of step 1201 and step 1202.

At step 1203, in response to determining that both the first base station and the second base station support paging cause capabilities, and determining to transmit a first paging cause for paging the inactive state terminal, the first paging cause is sent to the second base station through an inter-base station interface.

In the embodiment of the present disclosure, it may be determined that both the first base station and the second base station support paging cause capabilities under the condition that both the first paging cause capability information and the second paging cause capability information indicate that the paging cause capabilities are supported. Or, the capability information included in the first cause capability information indicates that the first base station at least supports a paging cause capability corresponding to a first paging cause, and the capability information included in the second cause capability information indicates that the second base station at least supports the paging cause capability corresponding to the first paging cause. At this time, it can be determined that both the first base station and the second base station support the paging cause capability.

In the above embodiment, the first base station and the second base station interact with each other's supported paging cause capabilities, so that, in the case where both support the paging cause capabilities, a first paging cause for paging a terminal in the inactive state can be directly sent to the second base station by the first base station, as the anchor base station, through the inter-base station interface. The purpose of interacting paging causes based on respective supported paging cause capabilities of different base stations is realized with high usability.

Figure 13:
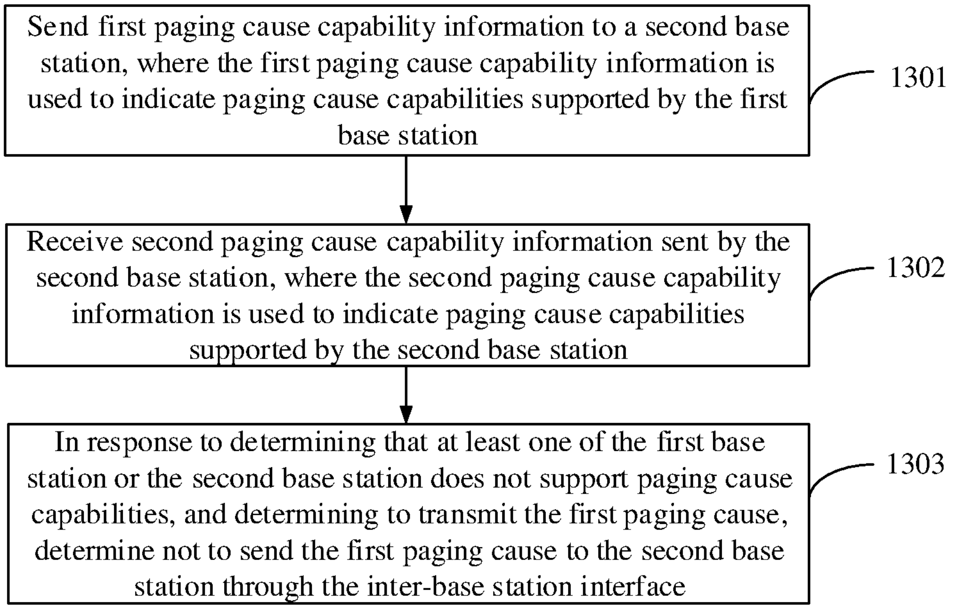
FIG. 13 is a schematic flowchart of another capability exchange method according to an embodiment of the present disclosure.

In some embodiments, the first base station may be an anchor base station corresponding to a terminal in an inactive state, and the second base station may be a base station corresponding to a cell where the inactive state terminal is currently located. Referring to FIG. 13, FIG. 13 is a flowchart of a capability exchange method illustrated according to an embodiment, which can be performed by a first base station, and the method may include the following steps.

At step 1301, first paging cause capability information is sent to a second base station, where the first paging cause capability information is used to indicate paging cause capabilities supported by the first base station.

At step 1302, second paging cause capability information sent by the second base station is received, where the second paging cause capability information is used to indicate paging cause capabilities supported by the second base station.

The present disclosure does not limit an execution order of step 1301 and step 1302.

At step 1303, in response to determining that at least one of the first base station or the second base station does not support paging cause capabilities, and determining to transmit the first paging cause, it is determined not to send the first paging cause to the second base station through the inter-base station interface.

In a possible implementation, if the first paging cause capability information indicates that the first base station does not support paging cause capabilities and/or the second paging cause capability information indicates that the second base station does not support paging cause capabilities, it can be determined that at least one of the first base station or the second base station does not support paging cause capabilities.

In another possible implementation, if the capability information included in the first paging cause capability information indicates that the first base station does not support the paging cause capability corresponding to the first paging cause, and/or the capability information included in the second paging cause capability information indicates that the second base station does not support the paging cause capability corresponding to the first paging cause, it can be determined that at least one of the first base station or the second base station does not support the paging cause capabilities.

In the above embodiment, it can be determined that the paging cause will not be exchanged through the interface between base stations under the condition that at least one base station does not support the paging cause capabilities, which is simple and convenient to realize and high in usability.

In some possible embodiments, for an inactive state terminal, in a case that the first base station is the anchor base station corresponding to the inactive terminal and the second base station is the base station corresponding to the cell where the inactive terminal is currently located, the first base station determines that the first paging cause needs to be transmitted when the first base station determines that the first paging cause is included in a radio access network (RAN) paging message sent to the second base station.

In the above embodiment, the first base station can determine that the first paging cause needs to be transmitted when the RAN paging message includes the first paging cause for paging the inactive state terminal, so that whether to directly interact with the first paging cause through the inter-base station interface can be determined based on the paging cause capabilities supported by the first base station and the second base station respectively.

Figure 14:
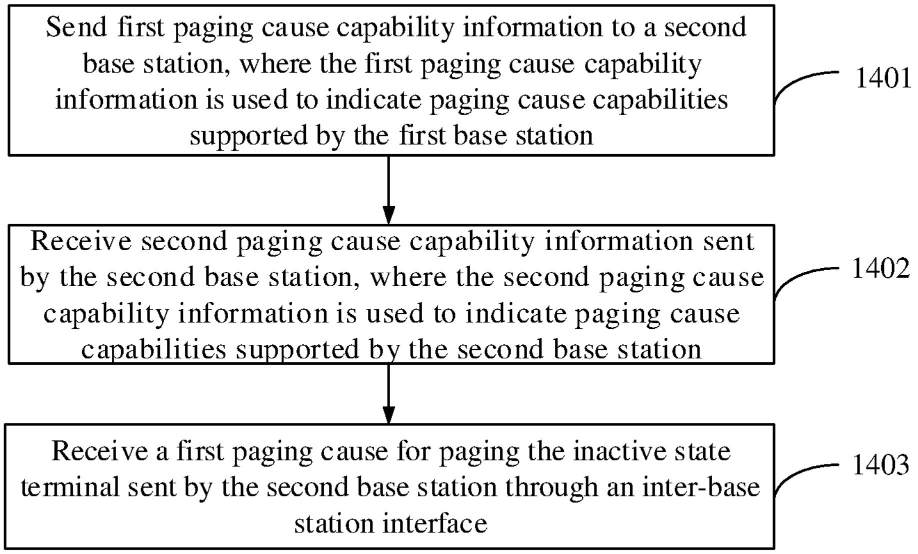
FIG. 14 is a schematic flowchart of another capability exchange method according to an embodiment of the present disclosure.

In some embodiments, the first base station is a base station corresponding to a cell where an inactive state terminal is currently located, and the second base station is an anchor base station corresponding to the inactive state terminal, with reference to FIG. 14, FIG. 14 is a flowchart of a capability exchange method illustrated according to an embodiment, which can be performed by a first base station, and the method may include the following steps. At step 1401, first paging cause capability information is sent to a second base station, where the first paging cause capability information is used to indicate paging cause capabilities supported by the first base station.

At step 1402, second paging cause capability information sent by the second base station is received, where the second paging cause capability information is used to indicate paging cause capabilities supported by the second base station.

The present disclosure does not limit an execution order of step 1401 and step 1402.

At step 1403, a first paging cause for paging the inactive state terminal sent by the second base station through an inter-base station interface is received.

In the embodiment of the present disclosure, the first paging cause is sent by the second base station in a case that the second base station determines that both the second base station and the first base station support paging cause capabilities and determines that the first paging cause is to be transmitted.

In the above embodiment, the first paging cause sent by the second base station can be received under the condition that the second base station is the anchor base station, where the second base station can send the first paging cause to the first base station in the case that the second base stations determines that they both support the paging cause capabilities based on the paging cause capabilities of the first base station and the second base station which interacted with each other before, and determines that the first paging cause is to be transmitted, which is simple and convenient to realize and has high usability.

In some embodiments, the first base station is the base station corresponding to the cell where the inactive state terminal is currently located, and the second base station is the anchor base station corresponding to the inactive state terminal, in case of the first base stations determines that at least one of itself or the second base station does not support the paging cause capabilities according to previous interaction with the second base station about the paging cause capabilities supported by each other, and determines that the second base station needs to transmit the first paging cause, the first base station can determine that the first paging cause sent by the second base station will not be received through the inter-base station interface.

In the above embodiment, the first base station can determine that it will not receive the first paging cause sent by the second base station through the inter-base station interface in a case that the first base station determines that at least one of itself or the second base station does not support the paging cause capabilities and that the second base station needs to transmit the first paging cause, thus improving the usability of the paging cause mechanism.

The above embodiment(s) is a solution for an inactive terminal. Based on the paging cause capabilities supported by each base station, the base stations determine whether to exchange the first paging cause for paging the inactive state terminal through the inter-base station interface. In the embodiment of the present disclosure, for a connected state terminal, it is also possible to determine whether to exchange a second paging cause for paging the connected state terminal through the inter-base station interface based on the paging cause capabilities supported by each base station.

Figure 15:
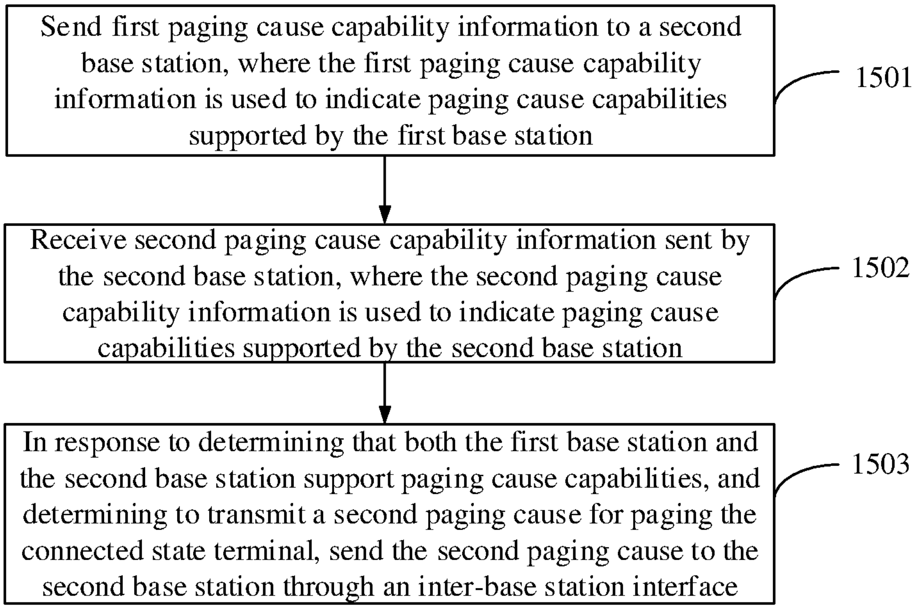
FIG. 15 is a schematic flowchart of a capability exchange method illustrated according to an embodiment of the present disclosure.

In some embodiments, the first base station is a serving base station of the connected state terminal, and the second base station is a serving base station to which the connected state terminal is to be handed over, with reference to FIG. 15, FIG. 15 is a flowchart of a capability exchange method illustrated according to an embodiment, which can be performed by a first base station, and the method may include the following steps.

At step 1501, first paging cause capability information is sent to a second base station, where the first paging cause capability information is used to indicate paging cause capabilities supported by the first base station.

At step 1502, second paging cause capability information sent by the second base station is received, where the second paging cause capability information is used to indicate paging cause capabilities supported by the second base station.

The present disclosure does not limit an execution order of step 1501 and step 1502.

At step 1503, in response to determining that both the first base station and the second base station support paging cause capabilities, and determining to transmit a second paging cause for paging the connected state terminal, the second paging cause is sent to the second base station through an inter-base station interface.

In the above embodiment, the first base station and the second base station interact with each other's supported paging cause capabilities, so that, in the case where both support the paging cause capabilities, a second paging cause for paging a connected state terminal can be directly sent to the second base station by the first base station as the current serving base station through the inter-base station interface. The purpose of interacting paging causes based on respective supported paging cause capabilities of different base stations is realized with high usability.

Figure 16:
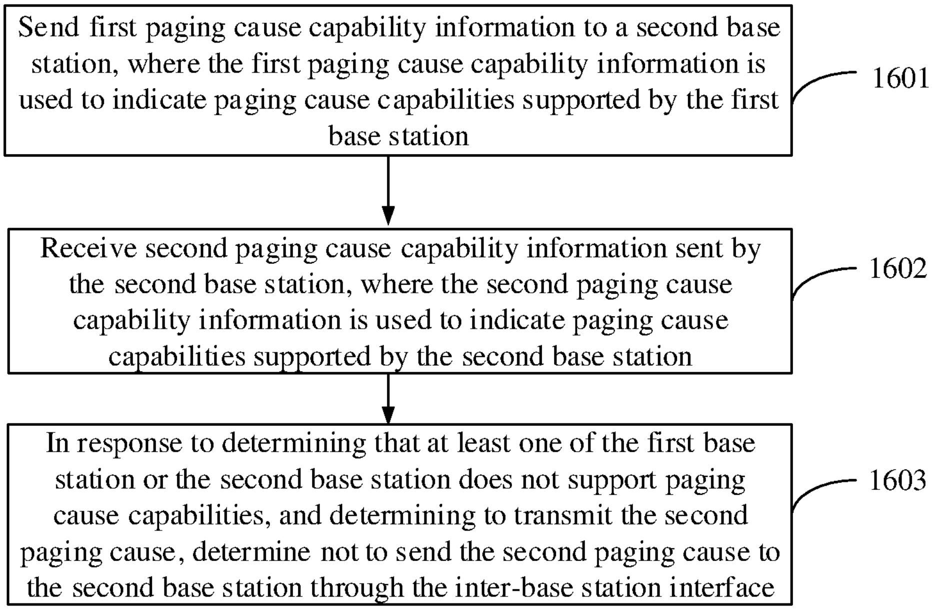
FIG. 16 is a schematic flowchart of another capability exchange method according to an embodiment of the present disclosure.

In some embodiments, the first base station is a serving base station of a connected state terminal, and the second base station is a serving base station to which the connected state terminal is to be handed over, with reference to FIG. 16, FIG. 16 is a flowchart of a capability exchange method illustrated according to an embodiment, which can be performed by a first base station, and the method may include the following steps.

At step 1601, first paging cause capability information is sent to a second base station, where the first paging cause capability information is used to indicate paging cause capabilities supported by the first base station.

At step 1602, second paging cause capability information sent by the second base station is received, where the second paging cause capability information is used to indicate paging cause capabilities supported by the second base station.

The present disclosure does not limit an execution order of step 1601 and step 1602.

At step 1603, in response to determining that at least one of the first base station or the second base station does not support paging cause capabilities, and determining to transmit the second paging cause, it is determined not to send the second paging cause to the second base station through the inter-base station interface.

In the above embodiment, the first base station and the second base station interact with each other's supported paging cause capabilities, so that, in the case where at least one of them does not support the paging cause capabilities, the first base station determines not to send the second paging cause to the second base station through the inter-base station interface. The purpose of interacting paging causes based on respective supported paging cause capabilities of different base stations is realized with high usability.

In some embodiments, when the first base station is the serving base station of the connected state terminal and the second base station is the serving base station to which the connected state terminal is to be handed over, the first base station may determine that the second paging cause needs to be transmitted when it is determined that signaling related to inter-base station handover sent to the second base station includes the second paging cause, where the signaling related to inter-base station handover includes but is not limited to handover request signaling.

The above is only an illustration, and the first base station may also determine to transmit a second paging cause based on other conditions, which are not limited by the present disclosure.

Figure 17:
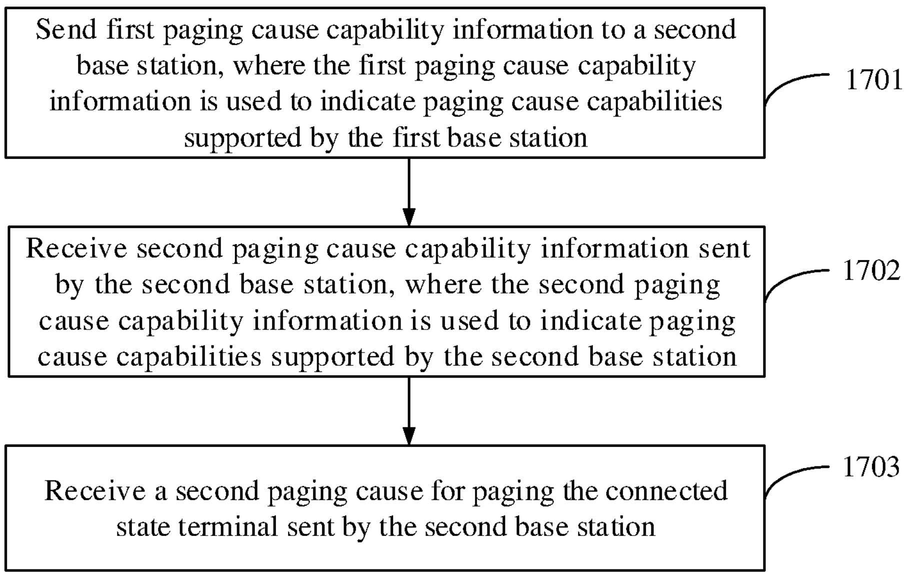
FIG. 17 is a schematic flowchart of another capability exchange method according to an embodiment of the present disclosure.

In some embodiments, the first base station is a serving base station to which a connected state terminal is to be handed over, and the second base station is a serving base station corresponding to the connected state terminal, with reference to FIG. 17, FIG. 17 is a flowchart of a capability exchange method illustrated according to an embodiment, which can be performed by a first base station, and the method may include the following steps.

At step 1701, first paging cause capability information is sent to a second base station, where the first paging cause capability information is used to indicate paging cause capabilities supported by the first base station.

At step 1702, second paging cause capability information sent by the second base station is received, where the second paging cause capability information is used to indicate paging cause capabilities supported by the second base station.

The present disclosure does not limit an execution order of step 1701 and step 1702.

At step 1703, a second paging cause for paging the connected state terminal sent by the second base station is received.

The second paging cause is sent by the second base station in a case that the second base station determines that both the second base station and the first base station support paging cause capabilities and determines that the second paging cause is to be transmitted.

In the above embodiment, the first base station can receive the second paging cause sent by the second base station, where the second paging cause is sent by the second base station when it is determined that both the second base station and the first base station support paging cause capabilities and the second paging cause is determined to be transmitted, thus improving the usability of the paging cause mechanism.

In some embodiments, when the first base station is the serving base station to which the connected terminal is to be handed over and the second base station is the serving base station corresponding to the connected state terminal, the first base station determines that at least one of the first base station or the second base station does not support the paging cause capabilities based on their respective supported paging cause capabilities interacting with the second base station, and determines that the second base station transmits the second paging cause, the first base station can determine that the second paging cause sent by the second base station will not be received through the inter-base station interface.

In the above embodiment, in the case of the first base station determines that at least one of itself or the second base station does not support the paging cause capabilities based on previously exchanged paging cause capabilities supported by itself and the second base station respectively, and that the second base station needs to transmit the second paging cause, the first base station determines that it will not receive the second paging cause through the inter-base station interface, which is simple and convenient to realize and high in usability.

The following will describe a capability exchange solution provided by the present disclosure for a non-dual connectivity system scenario.

Figure 18:
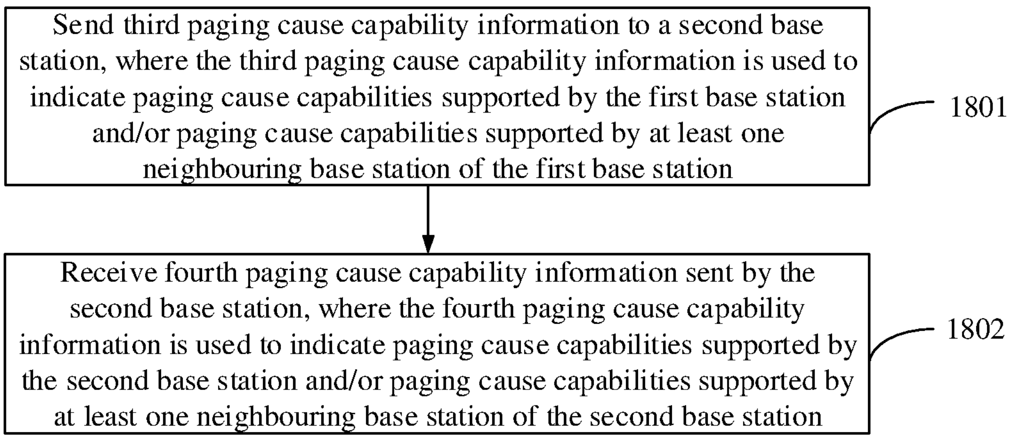
FIG. 18 is a schematic flowchart of another capability exchange method according to an embodiment of the present disclosure.

An embodiment of the present disclosure provides a capability exchange method, referring to FIG. 18, FIG. 18 is a flowchart of a capability exchange method illustrated according to an embodiment, which can be performed by a first base station, and the method may include the following steps.

At step 1801, third paging cause capability information is sent to a second base station, where the third paging cause capability information is used to indicate paging cause capabilities supported by the first base station and/or paging cause capabilities supported by at least one neighbouring base station of the first base station.

At step 1802, fourth paging cause capability information sent by the second base station is received, where the fourth paging cause capability information is used to indicate paging cause capabilities supported by the second base station and/or paging cause capabilities supported by at least one neighbouring base station of the second base station.

The present disclosure does not limit an execution order of step 1801 and step 1802.

In the above embodiment, the paging cause capabilities supported by each base station and/or the paging cause capabilities supported by at least one neighbouring base station can be exchanged, so that the usability of the paging cause mechanism is improved.

Figure 19:
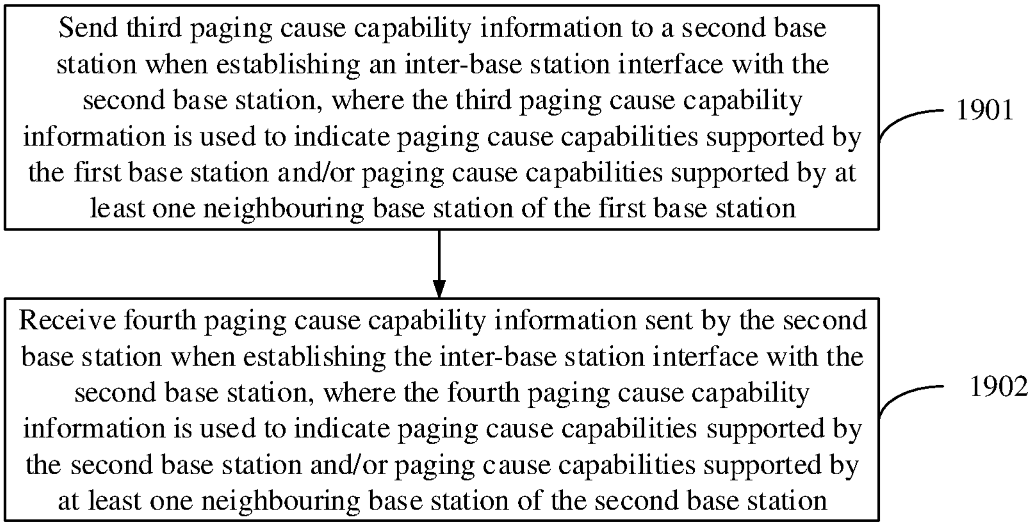
FIG. 19 is a schematic flowchart of another capability exchange method according to an embodiment of the present disclosure.

In some embodiments, with reference to FIG. 19, FIG. 19 is a flowchart of a capability exchange method illustrated according to an embodiment, which can be performed by a first base station, and the method may include the following steps.

At step 1901, third paging cause capability information is sent to a second base station when establishing an inter-base station interface with the second base station, where the third paging cause capability information is used to indicate paging cause capabilities supported by the first base station and/or paging cause capabilities supported by at least one neighbouring base station of the first base station.

At step 1902, fourth paging cause capability information sent by the second base station is received when establishing the inter-base station interface with the second base station, where the fourth paging cause capability information is used to indicate paging cause capabilities supported by the second base station and/or paging cause capabilities supported by at least one neighbouring base station of the second base station.

The present disclosure does not limit an execution order of step 1901 and step 1902.

In the above embodiment, in a process of establishing an interface between two base stations, the paging cause capabilities supported by each base station and/or the paging cause capabilities supported by at least one neighbouring base station of each base station can be exchanged, without a need for separate signaling for interaction, which is simple and convenient to realize and improves the usability of the paging cause mechanism.

Furthermore, it should be understood that an interaction of capabilities may not be limited to a period of establishing the interface between base stations, but may be within a predetermined time after establishing the interface, etc., which is not limited by the present disclosure.

In some embodiments, the third paging cause capability information sent by the first base station to the second base station may include at least one of the following: whether the first base station supports the paging cause capabilities;

whether at least one neighbouring base station of the first base station supports the paging cause capabilities; capability information of at least one paging cause capability supported by the first base station; and/or capability information of at least one paging cause capability supported by at least one neighbouring base station of the first base station.

The fourth paging cause capability information received by the first base station and sent by the second base station may include at least one of the following: whether the second base station supports the paging cause capabilities; whether at least one neighbouring base station of the second base station supports the paging cause capabilities; capability information of at least one paging cause capability supported by the second base station; and/or capability information of at least one paging cause capability supported by at least one neighbouring base station of the second base station.

In the above embodiment, in the non-dual connectivity scenario, base stations can exchange at least one of the paging cause capabilities supported by each base station, or the paging cause capabilities supported by at least one neighbouring base station of the respective base station, so that the usability of the paging cause mechanism is improved.

Figure 20:
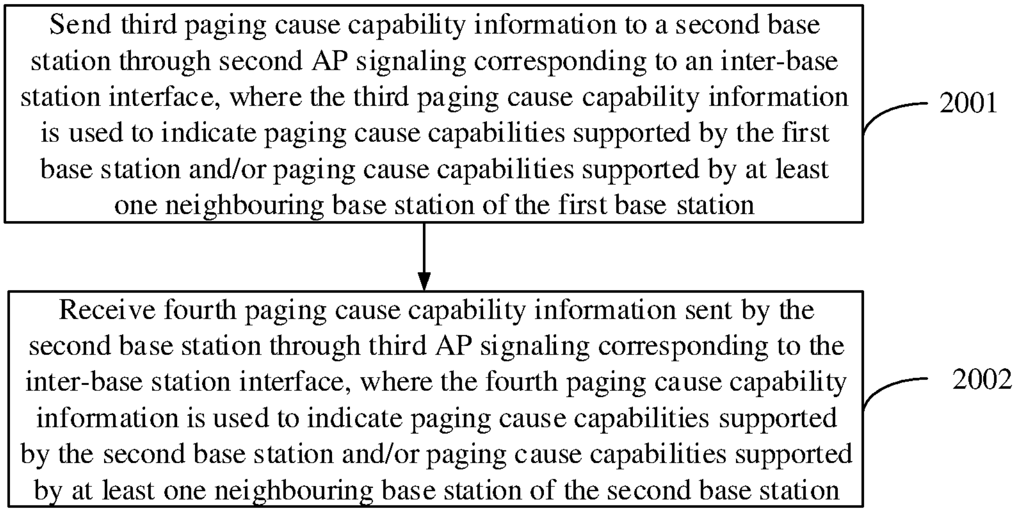
FIG. 20 is a schematic flowchart of another capability exchange method according to an embodiment of the present disclosure.

In some embodiments, the first base station can be a base station that initiates an interface establishment request, and the second base station can be a base station that receives the interface establishment request. Referring to FIG. 20, FIG. 20 is a flowchart of a capability exchange method illustrated according to an embodiment, which can be performed by a first base station, and the method may include the following steps.

At step 2001, third paging cause capability information is sent to a second base station through second AP signaling corresponding to an inter-base station interface, where the third paging cause capability information is used to indicate paging cause capabilities supported by the first base station and/or paging cause capabilities supported by at least one neighbouring base station of the first base station.

At step 2002, fourth paging cause capability information sent by the second base station is received through third AP signaling corresponding to the inter-base station interface, where the fourth paging cause capability information is used to indicate paging cause capabilities supported by the second base station and/or paging cause capabilities supported by at least one neighbouring base station of the second base station.

In the embodiment of the present disclosure, step 2001 may be performed first, followed by step 2002.

In the above embodiment, the paging cause capabilities supported by each base station and/or the paging cause capabilities supported by at least one neighbouring base station of the respective base station can be exchanged between the base stations through the second AP signaling and the third AP signaling, and the usability is high.

Figure 21:
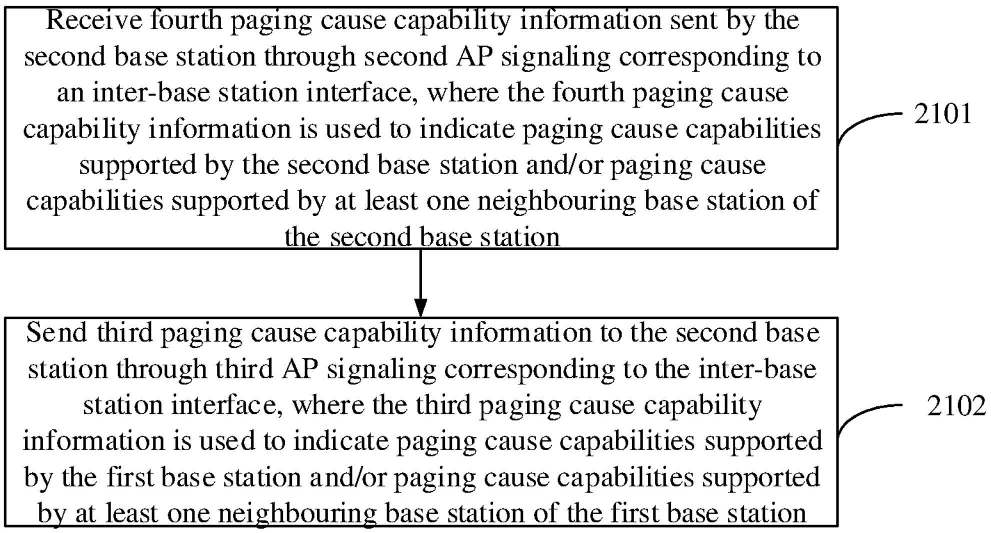
FIG. 21 is a schematic flowchart of another capability exchange method according to an embodiment of the present disclosure.

In some embodiments, the second base station can be a base station that initiates an interface establishment request, and the first base station can be a base station that receives the interface establishment request. Referring to FIG. 21, FIG. 21 is a flowchart of a capability exchange method illustrated according to an embodiment, which can be performed by a first base station, and the method may include the following steps.

At step 2101, fourth paging cause capability information sent by the second base station is received through second AP signaling corresponding to an inter-base station interface, where the fourth paging cause capability information is used to indicate paging cause capabilities supported by the second base station and/or paging cause capabilities supported by at least one neighbouring base station of the second base station.

At step 2102, third paging cause capability information is sent to the second base station through third AP signaling corresponding to the inter-base station interface, where the third paging cause capability information is used to indicate paging cause capabilities supported by the first base station and/or paging cause capabilities supported by at least one neighbouring base station of the first base station.

In the embodiment of the present disclosure, step 2101 may be performed first, followed by step 2102.

In the above embodiment, the paging cause capabilities supported by each base station and/or the paging cause capabilities supported by at least one neighbouring base station of the respective base station can be exchanged between the base stations through the second AP signaling and the third AP signaling, and the usability is high.

In some embodiments, when the first base station and the second base station are E-UTRAN base stations, the inter-base station interface between the first base station and the second base station is an X2 interface, and in the case that the first base station is the base station that initiated the interface establishment request, the third paging cause information can be sent to the second base station through the second AP signaling, where the second AP signaling can be X2 SETUP REQUEST signaling.

Further, the second AP signaling includes a second information element, and the second information element is an information element where the third paging cause capability information is located, and the second information element includes at least one of: a Served Cell Information element; a Neighbour Information element; an NR Neighbour Information (new radio neighbour information) element; and/or a first designated information element corresponding to the third paging cause capability information.

The first designated information element may be an information element newly added in the second AP signaling for transmitting the third paging cause capability information.

In addition, the second base station can send the fourth paging cause indication information to the first base station through the third AP signaling. The third AP signaling can be X2 SETUP RESPONSE signaling. the third AP signaling includes a third information element, and the third information element is an information element where the fourth paging cause capability information is located; the third information element includes at least one of: a Served Cell Information element; a Neighbour Information element; an NR Neighbour Information element; and/or a second designated information element corresponding to the fourth paging cause capability information.

The second designated information element may be an information element newly added in the third AP signaling for transmitting the fourth paging cause capability information.

In the above embodiment, the first base station, as the base station initiating the interface establishment request, can send the third paging cause capability information to the second base station through the second information element included in the second AP signaling, and the second base station can send the fourth paging cause capability information to the first base station through the third information element included in the third AP signaling, thus improving the usability of the paging cause mechanism.

In some embodiments, when the first base station and the second base station are E-UTRAN base stations, the inter-base station interface between the first base station and the second base station is an X2 interface, and in the case that the second base station is the base station that initiated the interface establishment request, the fourth paging cause information can be sent to the first base station through the second AP signaling, where the second AP signaling can be X2 SETUP REQUEST signaling.

Further, the second AP signaling includes a second information element, and the second information element is an information element where the fourth paging cause capability information is located, and the second information element includes at least one of: a Served Cell Information element; a Neighbour Information element; an NR Neighbour Information element; and/or a first designated information element corresponding to the fourth paging cause capability information.

The first designated information element may be an information element newly added in the second AP signaling for transmitting the fourth paging cause capability information.

In addition, the first base station can send the third paging cause indication information to the second base station through the third AP signaling. The third AP signaling can be X2 SETUP RESPONSE signaling. the third AP signaling includes a third information element, and the third information element is an information element where the third paging cause capability information is located; the third information element includes at least one of: a Served Cell Information element; a Neighbour Information element; an NR Neighbour Information element; and/or a second designated information element corresponding to the third paging cause capability information.

The second designated information element may be an information element newly added in the third AP signaling for transmitting the third paging cause capability information.

In the above embodiment, the first base station, as the base station receiving the interface establishment request, can first receive the fourth paging cause capability information sent by the second base station through the second information element included in the second AP signaling, and then the first base station sends the third paging cause capability information to the second base station through the third information element included in the third AP signaling, thus improving the usability of the paging cause mechanism.

In some embodiments, when the first base station and the second base station are NR base stations, the inter-base station interface between the first base station and the second base station is an Xn interface, and in the case that the first base station is the base station that initiated the interface establishment request, the third paging cause information can be sent to the second base station through the second AP signaling, where the second AP signaling can be Xn SETUP REQUEST signaling.

Further, the second AP signaling includes a second information element, and the second information element is an information element where the third paging cause capability information is located, and the second information element includes at least one of: a Served Cell Information NR information element in a List of Served Cells NR information element; a Neighbour Information NR information element in the List of Served Cells NR information element; a Neighbour Information E-UTRAN information element in the List of Served Cells NR information element; a Served Cell Information E-UTRA information element in a List of Served Cells E-UTRA information element; a Served Cell Information E-UTRA information element in the List of Served Cells E-UTRA information element; a Neighbour Information NR information element in the List of Served Cells E-UTRA information element; a Neighbour Information E-UTRAN information element in the List of Served Cells E-UTRA information element; or a third designated information element corresponding to the third paging cause capability information.

The third designated information element may be an information element newly added in the second AP signaling for transmitting the third paging cause capability information.

In addition, the second base station can send the fourth paging cause indication information to the first base station through the third AP signaling. The third AP signaling can be Xn SETUP RESPONSE signaling. the third AP signaling includes a third information element, and the third information element is an information element where the fourth paging cause capability information is located; the third information element includes at least one of: a fourth designated information element corresponding to the fourth paging cause capability information.

The fourth designated information element may be an information element newly added in the third AP signaling for transmitting the fourth paging cause capability information.

In the above embodiment, the first base station, as the base station initiating the interface establishment request, can send the third paging cause capability information to the second base station through the second information element included in the second AP signaling, and the second base station can send the fourth paging cause capability information to the first base station through the third information element included in the third AP signaling, thus improving the usability of the paging cause mechanism.

In some embodiments, when the first base station and the second base station are NR base stations, the inter-base station interface between the first base station and the second base station is an Xn interface, and when the second base station is the base station that initiated the interface establishment request, the fourth paging cause information can be sent to the first base station through the second AP signaling, where the second AP signaling can be Xn SETUP REQUEST signaling.

Further, the second AP signaling includes a second information element, where the second information element is an information element where the fourth paging cause capability information is located; and the second information element includes at least one of: a Served Cell Information NR information element in a List of Served Cells NR information element; a Neighbour Information NR information element in the List of Served Cells NR information element; a Neighbour Information E-UTRAN information element in the List of Served Cells NR information element; a Served Cell Information E-UTRA information element in a List of Served Cells E-UTRA information element; a Served Cell Information E-UTRA information element in the List of Served Cells E-UTRA information element; a Neighbour Information NR information element in the List of Served Cells E-UTRA information element; a Neighbour Information E-UTRAN information element in the List of Served Cells E-UTRA information element; or a third designated information element corresponding to the fourth paging cause capability information.

The third designated information element may be an information element newly added in the second AP signaling for transmitting the fourth paging cause capability information.

In addition, the first base station can send the third paging cause indication information to the second base station through the third AP signaling. The third AP signaling can Xn SETUP RESPONSE signaling. The third AP signaling includes a third information element, and the third information element is an information element where the third paging cause capability information is located; the third information element includes at least one of: a fourth designated information element corresponding to the third paging cause capability information.

The fourth designated information element may be an information element newly added in the third AP signaling for transmitting the third paging cause capability information.

In the above embodiment, the first base station, as the base station receiving the interface establishment request, can first receive the fourth paging cause capability information sent by the second base station through the second information element included in the second AP signaling, and then the first base station sends the third paging cause capability information to the second base station through the third information element included in the third AP signaling, thus improving the usability of the paging cause mechanism.

Figure 22:
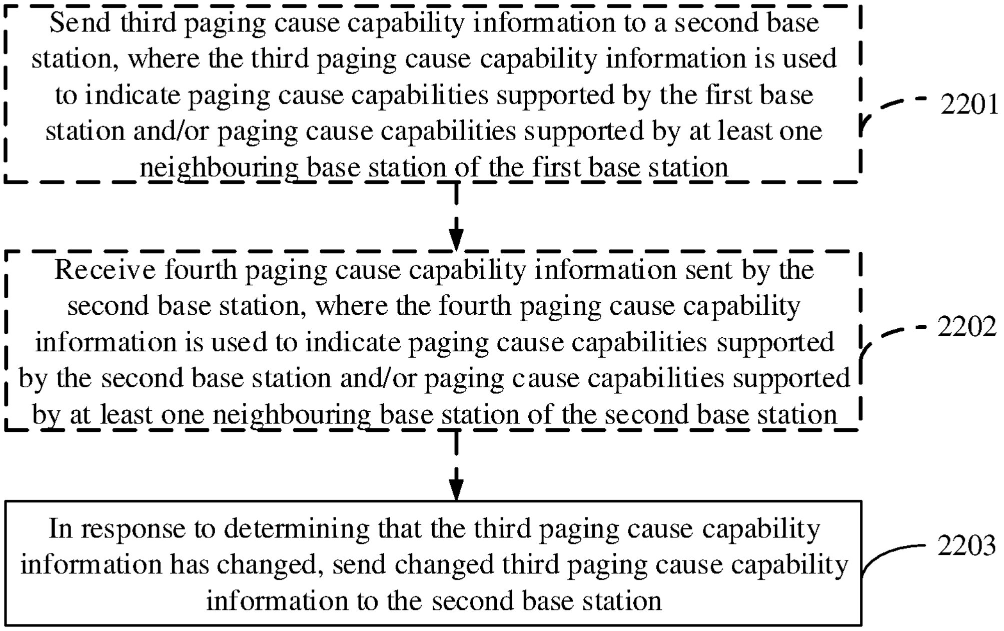
FIG. 22 is a schematic flowchart of another capability exchange method according to an embodiment of the present disclosure.

In some embodiments, with reference to FIG. 22, FIG. 22 is a flowchart of a capability exchange method illustrated according to an embodiment, which can be performed by a first base station, and the method may include the following steps.

At step 2203, in response to determining that the third paging cause capability information has changed, changed third paging cause capability information is sent to the second base station.

In the embodiment of the present disclosure, step 2203 can be implemented independently, and the first base station can send the changed third paging cause capability information to the second base station in a case that the paging cause capability corresponding to itself and/or at least one of its neighbouring base stations has changed.

In the above embodiment, the changed paging cause capability can be exchanged between base stations in time, and the usability is high.

In some examples, before executing the step 2203, the method may further include:

At step 2201, third paging cause capability information is sent to a second base station, where the third paging cause capability information is used to indicate paging cause capabilities supported by the first base station and/or paging cause capabilities supported by at least one neighbouring base station of the first base station.

At step 2202, fourth paging cause capability information sent by the second base station is received, where the fourth paging cause capability information is used to indicate paging cause capabilities supported by the second base station and/or paging cause capabilities supported by at least one neighbouring base station of the second base station.

The present disclosure does not limit an execution order of step 2201 and step 2202. That is, step 2203 can be implemented in combination with step 2201 and step 2202, and the present disclosure does not limit this.

In some embodiments, if the first base station determines that the third paging cause capability information has changed, the first base station can send the changed third paging cause capability information to the second base station through the first AP signaling corresponding to the inter-base station interface.

Or, after the first base station and the second base station exchange the paging cause capabilities supported by each base station and/or the paging cause capabilities supported by at least one neighbouring base station of each base station, if the first base station determines that the third paging cause capability information has changed, the first base station can send the changed third paging cause capability information to the second base station through the first AP signaling corresponding to the inter-base station interface.

Specifically, the first base station may send the changed third paging cause capability information to the second base station through a first information element included in the first AP signaling.

In a possible implementation, if the first base station and the second base station are E-UTRAN base stations, the first AP signaling is X2AP signaling.

Specifically, the first AP signaling can be specifically ENB CONFIGURATION UPDATE (base station/eNodeB configuration update) signaling, and the first information element includes at least one of the following: a Served Cells To Add (add served cells) information element; and/or a Served Cells To Modify (modify served cells) information element.

In another possible implementation, if the first base station and the second base station are NR base stations, the first AP signaling is XnAP signaling.

Further, the first AP signaling can be specifically NG-RAN NODE CONFIGURATION UPDATE signaling, and the first information element includes at least one of: an ng information element; and/or an ng-eNB information element.

In the above embodiment, the first base station can send the changed third paging cause capability information to the second base station through the first information element included in the first AP signaling in a case that the third paging cause capability information has changed, which has high usability.

In some embodiments, if the second base station determines that the fourth paging cause capability information has changed, the second base station can send changed fourth paging cause capability information to the first base station through the first AP signaling corresponding to the inter-base station interface. The first base station only needs to receive the changed fourth paging cause capability information sent by the second base station through the inter-base station interface.

Or, after the first base station and the second base station exchange the paging cause capabilities supported by each base station and/or the paging cause capabilities supported by at least one neighbouring base station of each base station, if the second base station determines that the fourth paging cause capability information has changed, the second base station can send the changed fourth paging cause capability information to the first base station through the first AP signaling corresponding to the inter-base station interface. The first base station only needs to receive the changed fourth paging cause capability information sent by the second base station through the inter-base station interface.

In the above embodiment, the second base station can send the changed fourth paging cause capability information to the first base station through the first information element included in the first AP signaling in a case that the fourth paging cause capability information has changed, which has high usability.

In some embodiments, the first base station determines that the third paging cause capability information has changed and the second base station determines that the fourth paging cause capability information has changed, then the first base station and the second base station can exchange the changed third paging cause capability information and the changed fourth paging cause capability information.

Or, after the first base station and the second base station exchange the paging cause capabilities supported by each base station and/or the paging cause capabilities supported by at least one neighbouring base station of each base station, the first base station determines that the third paging cause capability information has changed, and the second base station determines that the fourth paging cause capability information has changed, then the second base station can exchange the changed third paging cause capability information and the changed fourth paging cause capability information.

In the above embodiment, the changed paging cause capability information can be exchanged between base stations in time, which is simple and convenient to realize and has high usability.

In some embodiments, in the non-dual connectivity scenario, the first base station is an anchor base station corresponding to an inactive state terminal, and the second base station is a base station corresponding to a cell where the inactive state terminal is currently located. Then, after the first base station and the second base station have exchanged their respective supported paging cause capabilities and/or paging cause capabilities supported by at least one neighbouring base station of each base station, if the first base station determines that both the first base station and the second base station support paging cause capabilities, and determines to transmit a first paging cause for paging the inactive state terminal, the first base station can directly send the first paging cause to the second base station through the inter-base station interface.

The way of sending the first paging cause to the second base station is similar to the way of sending in the dual connectivity scenario described above, and will not be repeated here.

In the above embodiment, in the case that the first base station determines that both the first base station and the second base station support paging cause capabilities based on their respective supported paging cause capabilities previously interacted with the second base station, and determines to transmit a first paging cause for paging the inactive state terminal, the first base station directly send the first paging cause to the second base station through the inter-base station interface, thus improving the usability of the paging cause mechanism.

In some embodiments, in the non-dual connectivity scenario, the first base station is an anchor base station corresponding to an inactive state terminal, and the second base station is a base station corresponding to a cell where the inactive state terminal is currently located. Then, after the first base station and the second base station have exchanged their respective supported paging cause capabilities and/or paging cause capabilities supported by at least one neighbouring base station of each base station, if the first base station determines that at least one of the first base station or the second base station does not support paging cause capabilities and determines to transmit the first paging cause, the first base station determines not to send the first paging cause to the second base station through the inter-base station interface.

In some embodiments, the first base station may include the first paging cause is included in a radio access network (RAN) paging message sent to the second base station, and determine to transmit the first paging cause.

In some embodiments, in the non-dual connectivity scenario, the second base station is an anchor base station corresponding to an inactive state terminal, and the first base station is a base station corresponding to a cell where the inactive state terminal is currently located. Then, after the first base station and the second base station have exchanged their respective supported paging cause capabilities and/or paging cause capabilities supported by at least one neighbouring base station of each base station, the first base station can receive the first paging cause for paging the inactive state terminal sent by the second base station through the inter-base station interface.

The first paging cause is sent by the second base station in a case that the second base station determines that both the second base station and the first base station support paging cause capabilities, and determines that the first paging cause is to be transmitted.

In the above embodiment, the first base station can directly receive the second paging cause through the inter-base station interface, which is simple to implement and high in usability.

In some embodiments, in the non-dual connectivity scenario, the second base station is an anchor base station corresponding to an inactive state terminal, and the first base station is a base station corresponding to a cell where the inactive state terminal is currently located. Then, after the first base station and the second base station have exchanged their respective supported paging cause capabilities and/or paging cause capabilities supported by at least one neighbouring base station of each base station, if at least one of the first base station or the second base station does not support paging cause capabilities and it is determined that the second base station transmits the first paging cause, the first base station determines that the first paging cause sent by the second base station will not be received through the inter-base station interface.

In some embodiments, in the non-dual connectivity scenario, the first base station is a serving base station of the connected state terminal, and the second base station is a serving base station to which the connected state terminal is to be handed over. Then, after the first base station and the second base station have exchanged their respective supported paging cause capabilities and/or paging cause capabilities supported by at least one neighbouring base station of each base station, if it is determined that both the first base station and the second base station support paging cause capabilities, and a second paging cause for paging the connected state terminal is determined to be transmitted, the second paging cause is sent to the second base station through the inter-base station interface.

In some embodiments, in the non-dual connectivity scenario, the first base station is a serving base station of the connected state terminal, and the second base station is a serving base station to which the connected state terminal is to be handed over. Then, after the first base station and the second base station have exchanged their respective supported paging cause capabilities and/or paging cause capabilities supported by at least one neighbouring base station of each base station, if it is determined that at least one of the first base station or the second base station does not support paging cause capabilities, and the second paging cause is determined to be transmitted, it is determined that the second paging cause will not be transmitted to the second base station through the inter-base station interface.

In some embodiments, in the non-dual connectivity scenario, the second base station a serving base station of the connected state terminal, and the first base station is a serving base station to which the connected state terminal is to be handed over. Then, after the first base station and the second base station have exchanged their respective supported paging cause capabilities and/or paging cause capabilities supported by at least one neighbouring base station of each base station, the first base station can receive the second paging cause for paging the connected state terminal sent by the second base station.

The second paging cause is sent by the second base station in a case that the second base station determines that both the second base station and the first base station support paging cause capabilities and determines that the second paging cause is to be transmitted.

In some embodiments, in the non-dual connectivity scenario, the second base station is a serving base station of the connected state terminal, and the first base station is a serving base station to which the connected state terminal is to be handed over. Then, after the first base station and the second base station have exchanged their respective supported paging cause capabilities and/or paging cause capabilities supported by at least one neighbouring base station of each base station, if the first base station determines that at least one of the first base station or the second base station does not support paging cause capabilities, and determines that the second base station transmits the second paging cause, the first base station determines that the second paging cause sent by the second base station will not be received through the inter-base station interface.

In the above embodiment, the first base station and the second base station can determine whether to exchange the second paging cause through the interface between the base stations for an idle state terminal, which is simple to implement and high in usability.

The technical solutions provided by the embodiments of the present disclosure can include the following beneficial effects:

In the present disclosure, a first base station can send first paging cause capability information to a second base station and receive second paging cause capability information sent by the second base station, where the first paging cause capability information is used to indicate paging cause capabilities supported by the first base station and the second paging cause capability information is used to indicate paging cause capabilities supported by the second base station. According to the present disclosure, the paging cause capabilities supported by each base station can be exchanged, so that the usability of the paging cause mechanism is improved.

In the present disclosure, a first base station can send third paging cause capability information to a second base station and receive fourth paging cause capability information sent by the second base station, where the third paging cause capability information is used to indicate paging cause capabilities supported by the first base station and/or paging cause capabilities supported by at least one neighbouring base station of the first base station, and the fourth paging cause capability information is used to indicate paging cause capabilities supported by the second base station and/or paging cause capabilities supported by at least one neighbouring base station of the second base station. According to the present disclosure, the paging cause capabilities supported by each base station and/or the paging cause capabilities supported by at least one neighbouring base station of each base station can be exchanged, so that the usability of the paging cause mechanism is improved.

Corresponding to the foregoing embodiments of the capability exchange methods, the present disclosure further provides embodiments of capability exchange apparatuses.

Figure 23:
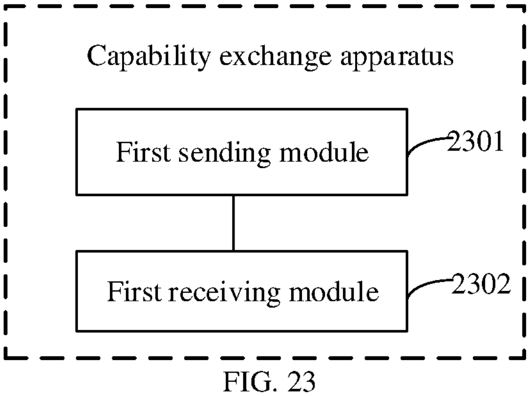
FIG. 23 is a block diagram of a capability exchange apparatus according to an embodiment of the present disclosure.

Referring to FIG. 23, FIG. 23 is a block diagram of a capability exchange apparatus according to an embodiment of the present disclosure, which is applied to a first base station and includes:

a first sending module 2301, configured to send first paging cause capability information to a second base station, where the first paging cause capability information is used to indicate paging cause capabilities supported by the first base station; and a first receiving module 2302, configured to receive second paging cause capability information sent by the second base station, where the second paging cause capability information is used to indicate paging cause capabilities supported by the second base station.

Figure 24:
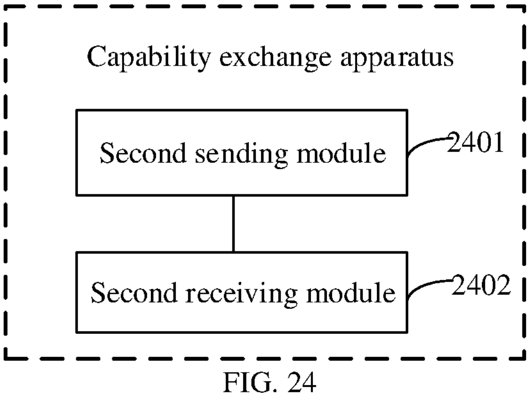
FIG. 24 is a block diagram of another capability exchange apparatus according to an embodiment of the present disclosure.

Referring to FIG. 24, FIG. 24 is a block diagram of another capability exchange apparatus according to an embodiment of the present disclosure, which is applied to a first base station and includes:

a second sending module 2401, configured to send third paging cause capability information to a second base station, where the third paging cause capability information is used to indicate paging cause capabilities supported by the first base station and/or paging cause capabilities supported by at least one neighbouring base station of the first base station; and a second receiving module 2402, configured to receive fourth paging cause capability information sent by the second base station, where the fourth paging cause capability information is used to indicate paging cause capabilities supported by the second base station and/or paging cause capabilities supported by at least one neighbouring base station of the second base station.

For the apparatus embodiment, because it basically corresponds to the method embodiment, it is only necessary to refer to the method embodiment for the relevant part of the description. The apparatus embodiments described above are only schematic, in which the units described above as separate components may or may not be physically separated, and the components displayed as units may or may not be physical units, that is, they may be located in one place or distributed to multiple network units. Some or all of the modules can be selected according to actual needs to achieve the purpose of the solution of the present disclosure. It can be understood and implemented by a person of ordinary skill in the art without creative labor.

Correspondingly, the present disclosure further provides a computer-readable storage medium, where the storage medium stores a computer program for executing the capability exchange method according to any of the above.

Correspondingly, the present disclosure further provides a capability exchange apparatus, including:

a processor; and a memory, configured to store processor-executable instructions;

where the processor is configured to execute the capability exchange method according to any of the above.

Figure 25:
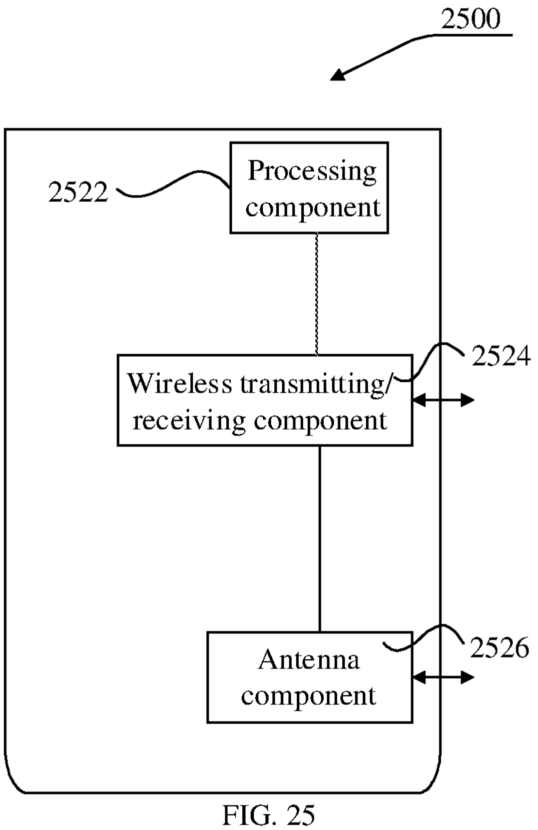
FIG. 25 is a schematic structural diagram of a capability exchange apparatus according to an embodiment of the present disclosure of the present disclosure.

As shown in FIG. 25, FIG. 25 is a schematic structural diagram of a capability exchange apparatus 2500 according to an embodiment of the present disclosure. The apparatus

2500 may be provided as a base station, specifically, it may refer to the first base station or the second base station in the above embodiment. Referring to FIG. 25, the apparatus 2500 includes a processing component 2522, a wireless transmitting/receiving component 2524, an antenna component 2526, and a signal processing part unique to a wireless interface, and the processing component 2522 may further include at least one processor.

One of the processors in the processing component 2522 may be configured to perform any of the capability exchange methods described above.

Other embodiments of the present disclosure will easily occur to those skilled in the art after considering the specification and practicing the present disclosure disclosed herein. The present disclosure is intended to cover any variations, uses or adaptations of the present disclosure, and these variations, uses or adaptations follow general principles of the present disclosure and include common sense or common technical means in the technical field that are not disclosed in the present disclosure. The specification and embodiments are to be regarded as examples only, and true scope and spirit of the present disclosure are indicated by the following claims.

It should be understood that the present disclosure is not limited to precise structures described above and shown in the accompanying drawings, and various modifications and changes can be made without departing from its scope. The scope of the present disclosure is limited only by the appended claims.

The invention claimed is:

1. A capability exchange method, performed by a first base station, comprising:

sending first paging cause capability information to a second base station, wherein the first paging cause capability information indicates at least one of paging cause capabilities supported by the first base station or paging cause capabilities supported by at least one neighbouring base station of the first base station; and receiving second paging cause capability information sent by the second base station, wherein the second paging cause capability information indicates at least one of paging cause capabilities supported by the second base station or paging cause capabilities supported by at least one neighbouring base station of the second base station;

wherein the first base station is an anchor base station corresponding to an inactive state terminal, and the second base station is a base station corresponding to a cell where the inactive state terminal is currently located, and the method further comprises: in response to determining that both the first base station and the second base station support paging cause capabilities, and determining to transmit a first paging cause for paging the inactive state terminal, sending the first paging cause to the second base station through an inter-base station interface;

wherein the first base station is a base station corresponding to a cell where an inactive state terminal is currently located, and the second base station is an anchor base station corresponding to the inactive state terminal, and the method further comprises: receiving a first paging cause for paging the inactive state terminal sent by the second base station through an inter-base station interface, wherein the first paging cause is sent by the second base station in a case that both the second base station and the first base station support paging cause capabilities and the first paging cause is determined to be transmitted;

wherein the first base station is a serving base station of a connected state terminal, and the second base station is a serving base station to which the connected state terminal is to be handed over, and the method further comprises: in response to determining that both the first base station and the second base station support paging cause capabilities, and determining to transmit a second paging cause for paging the connected state terminal, sending the second paging cause to the second base station through an inter-base station interface; or wherein the first base station is a serving base station to which a connected state terminal is to be handed over, and the second base station is a serving base station corresponding to the connected state terminal, and the method further comprises: receiving a second paging cause for paging the connected state terminal sent by the second base station, wherein the second paging cause is sent by the second base station in a case that both the second base station and the first base station support paging cause capabilities and the second paging cause is determined to be sent.

2. The method according to claim 1, wherein sending the first paging cause capability information to the second base station comprises:

sending the first paging cause capability information to the second base station when establishing an inter-base station interface with the second base station;

and receiving the second paging cause capability information sent by the second base station comprises:

receiving the second paging cause capability information to the second base station when establishing the inter-base station interface with the second base station.

3. The method according to claim 1, wherein the first paging cause capability information comprises at least one of:

whether the first base station supports the paging cause capabilities;

whether at least one neighbouring base station of the first base station supports the paging cause capabilities;

capability information of at least one paging cause capability supported by the first base station; or capability information of at least one paging cause capability supported by at least one neighbouring base station of the first base station;

the second paging cause capability information comprises at least one of:

whether the second base station supports the paging cause capabilities;

whether at least one neighbouring base station of the second base station supports the paging cause capabilities;

capability information of at least one paging cause capability supported by the second base station; or capability information of at least one paging cause capability supported by at least one neighbouring base station of the second base station.

4. The method according to claim 1, wherein:

the first base station is a base station initiating an interface establishment request;

wherein sending the first paging cause capability information to the second base station comprises:

sending the first paging cause capability information to the second base station through second application protocol (AP) signaling corresponding to an inter-base station interface;

wherein receiving the second paging cause capability information sent by the second base station comprises:

receiving the second paging cause capability information sent by the second base station through third AP signaling corresponding to the inter-base station interface; or the second base station is a base station initiating an interface establishment request;

wherein receiving the second paging cause capability information sent by the second base station comprises:

receiving the second paging cause capability information sent by the second base station through second application protocol (AP) signaling corresponding to an inter-base station interface;

wherein sending the first paging cause capability information to the second base station comprises:

sending the first paging cause capability information to the second base station through third AP signaling corresponding to the inter-base station interface.

5. The method according to claim 4, wherein:

when the first base station and the second base station are evolved UMTS terrestrial radio access network (E-UTRAN) base stations, the inter-base station interface is an X2 interface, the second AP signaling is X2 SETUP REQUEST signaling, and the third AP signaling is X2 SETUP RESPONSE signaling;

wherein the second AP signaling comprises a second information element, and the second information element is an information element where the second paging cause capability information or the first paging cause capability information is located, and the second information element comprises at least one of:

a Served Cell Information element;

a Neighbour Information element;

an NR Neighbour Information element; or a first designated information element corresponding to the second paging cause capability information or the first paging cause capability information;

wherein the third AP signaling comprises a third information element, and the third information element is an information element where the first paging cause capability information or the second paging cause capability information is located, and the third information element comprises at least one of:

a Served Cell Information element;

a Neighbour Information element;

an NR Neighbour Information element; or a second designated information element corresponding to the first paging cause capability information or the second paging cause capability information; or when the first base station and the second base station are new radio (NR) base stations, the inter-base station interface is an Xn interface, the second AP signaling is Xn SETUP REQUEST signaling, and the third AP signaling is Xn SETUP RESPONSE signaling;

wherein the second AP signaling comprises a second information element, and the second information element is an information element where the second paging cause capability information or the first paging cause capability information is located, and the second information element comprises at least one of:

a Served Cell Information NR information element in a List of Served Cells NR information element;

a Neighbour Information NR information element in the List of Served Cells NR information element;

a Neighbour Information E-UTRAN information element in the List of Served Cells NR information element;

a Served Cell Information E-UTRA information element in a List of Served Cells E-UTRA information element;

a Served Cell Information E-UTRA information element in the List of Served Cells E-UTRA information element;

a Neighbour Information NR information element in the List of Served Cells E-UTRA information element;

a Neighbour Information E-UTRAN information element in the List of Served Cells E-UTRA information element; or a third designated information element corresponding to the second paging cause capability information or the first paging cause capability information;

wherein the third AP signaling comprises a third information element, and the third information element is an information element where the first paging cause capability information or the second paging cause capability information is located, and the third information element comprises:

a fourth designated information element corresponding to the first paging cause capability information or the second paging cause capability information.

6. The method according to claim 1, further comprising:

in response to determining that the first paging cause capability information has changed, sending changed first paging cause capability information to the second base station;

wherein sending the changed first paging cause capability information to the second base station comprises:

sending the changed first paging cause capability information to the second base station through first application protocol (AP) signaling corresponding to an inter-base station interface;

wherein sending the changed first paging cause capability information to the second base station through the first AP signaling corresponding to the inter-base station interface comprises:

sending the changed first paging cause capability information to the second base station through a first information element comprised in the first AP signaling;

wherein:

when the first base station and the second base station are evolved UMTS terrestrial radio access network (E-UTRAN) base stations, the first AP signaling is X2AP signaling; wherein the first AP signaling is ENB CONFIGURATION UPDATE signaling, and the first information element comprises at least one of:

a Served Cells To Add information element; or a Served Cells To Modify information element; or when the first base station and the second base station are new radio NR base stations, the first AP signaling is XnAP signaling; wherein the first AP signaling is NG-RAN NODE CONFIGURATION UPDATE signaling, and the first information element comprises at least one of:

a next generation (ng) information element; or a next generation eNodeB (ng-eNB) information element.

7. The method according to claim 1, further comprising:

receiving changed second paging cause capability information sent by the second base station.

8. The method according to claim 1, wherein:

the first base station is an anchor base station corresponding to an inactive state terminal, and the second base station is a base station corresponding to a cell where the inactive state terminal is currently located, and the method further comprises:

in response to determining that at least one of the first base station or the second base station does not support paging cause capabilities, and determining to transmit the first paging cause, determining not to send the first paging cause to the second base station through the inter-base station interface;

wherein determining to transmit the first paging cause for paging the inactive state terminal comprises:

in response to determining that the first paging cause is comprised in a radio access network (RAN) paging message sent to the second base station, determining to transmit the first paging cause; or the first base station is a base station corresponding to a cell where an inactive state terminal is currently located, and the second base station is an anchor base station corresponding to the inactive state terminal, and the method further comprises:

in response to determining that at least one of the second base station or the first base station does not support paging cause capabilities, and determining that the second base station transmits the first paging cause, determining not to receive the first paging cause sent by the second base station through an inter-base station interface.

9. The method according to claim 1, wherein:

the first base station is a serving base station of a connected state terminal, and the second base station is a serving base station to which the connected state terminal is to be handed over, and the method further comprises:

in response to determining that at least one of the first base station or the second base station does not support paging cause capabilities, and determining to transmit the second paging cause, determining not to send the second paging cause to the second base station through the inter-base station interface; or the first base station is a serving base station to which a connected state terminal is to be handed over, and the second base station is a serving base station corresponding to the connected state terminal, and the method further comprises:

in response to determining that at least one of the first base station or the second base station does not support paging cause capabilities, and determining that the second base station transmits the second paging cause, determining not to receive the second paging cause sent by the second base station through an inter-base station interface.

10. A first base station, comprising:

a processor; and a memory storing processor-executable instructions;

wherein the processor is configured to:

send first paging cause capability information to a second base station, wherein the first paging cause capability information indicates at least one of paging cause capabilities supported by a first base station or paging cause capabilities supported by at least one neighbouring base station of the first base station; and receive second paging cause capability information sent by the second base station, wherein the second paging cause capability information indicates at least one of paging cause capabilities supported by the second base station or paging cause capabilities supported by at least one neighbouring base station of the second base station;

wherein the first base station is an anchor base station corresponding to an inactive state terminal, and the second base station is a base station corresponding to a cell where the inactive state terminal is currently located, and the processor is further configured to: in response to determining that both the first base station and the second base station support paging cause capabilities, and determining to transmit a first paging cause for paging the inactive state terminal, send the first paging cause to the second base station through an inter-base station interface;

wherein the first base station is a base station corresponding to a cell where an inactive state terminal is currently located, and the second base station is an anchor base station corresponding to the inactive state terminal, and the processor is further configured to: receive a first paging cause for paging the inactive state terminal sent by the second base station through an inter-base station interface, wherein the first paging cause is sent by the second base station in a case that both the second base station and the first base station support paging cause capabilities and the first paging cause is determined to be transmitted;

wherein the first base station is a serving base station of a connected state terminal, and the second base station is a serving base station to which the connected state terminal is to be handed over, and the processor is further configured to: in response to determining that both the first base station and the second base station support paging cause capabilities, and determining to transmit a second paging cause for paging the connected state terminal, send the second paging cause to the second base station through an inter-base station interface; or wherein the first base station is a serving base station to which a connected state terminal is to be handed over, and the second base station is a serving base station corresponding to the connected state terminal, and the processor is further configured to: receive a second paging cause for paging the connected state terminal sent by the second base station, wherein the second paging cause is sent by the second base station in a case that both the second base station and the first base station support paging cause capabilities and the second paging cause is determined to be sent.

* * * * *